(12) United States Patent
Castonguay et al.

(10) Patent No.: US 10,102,597 B1
(45) Date of Patent: Oct. 16, 2018

(54) INTERNET BASED INTERACTIVE GRAPHICAL INTERFACE FOR REAL ESTATE LISTINGS

(75) Inventors: Keith Castonguay, Champlin, MN (US); Tim Ostendorf, Coon Rapids, MN (US)

(73) Assignee: The MLSOnline.com, Inc., Minneapolis, MN (US)

( * ) Notice: Subject to any disclaimer, the term of this patent is extended or adjusted under 35 U.S.C. 154(b) by 1183 days.

(21) Appl. No.: 11/924,952

(22) Filed: Oct. 26, 2007

Related U.S. Application Data

(60) Provisional application No. 60/863,515, filed on Oct. 30, 2006, provisional application No. 60/942,590, filed on Jun. 7, 2007.

(51) Int. Cl.
*G06Q 50/16* (2012.01)
*G06F 3/0484* (2013.01)

(52) U.S. Cl.
CPC ........... *G06Q 50/16* (2013.01); *G06F 3/0484* (2013.01)

(58) Field of Classification Search
USPC .......................................................... 705/1
See application file for complete search history.

(56) References Cited

U.S. PATENT DOCUMENTS

| | | |
|---|---|---|
| 3,936,667 A | 2/1976 | Loubal |
| 4,429,385 A | 1/1984 | Cichelli |
| 4,532,695 A | 7/1985 | Wallet |
| 4,553,206 A | 11/1985 | Smutek |
| 4,635,136 A | 1/1987 | Ciampa |
| 4,870,576 A | 9/1989 | Tornetta |
| 4,891,761 A * | 1/1990 | Gray et al. ..................... 701/461 |
| 5,032,989 A | 7/1991 | Tornetta |
| 5,073,771 A * | 12/1991 | Satta et al. ..................... 345/667 |
| 5,341,466 A * | 8/1994 | Perlin et al. .................. 345/668 |
| 5,475,812 A * | 12/1995 | Corona et al. ................ 715/807 |
| 5,555,354 A * | 9/1996 | Strasnick et al. ............. 345/427 |

(Continued)

OTHER PUBLICATIONS

J. Cao et al., *REALMEDIA: Providing multimedia-based real-estate services through the Internet*, Automation in Construction 10 (2001) 275-289.

(Continued)

*Primary Examiner* — Partick McAtee
(74) *Attorney, Agent, or Firm* — Meuting, Raasch & Gehbardt, P.A.

(57) ABSTRACT

A method for searching real estate listings utilizing the Internet includes displaying, on a display device, an interactive map area on an Internet web page interactive graphical interface. The interactive map area displays satellite imagery, aerial photo imagery, or a rendered graphic street map. Then the method includes overlaying a focusing box on the interactive map area. The focusing box is movable about the interactive map area and displays a location title indicating a location of the focusing box on the interactive map area and the focusing box defines a focusing box area on the interactive map area. Then the method includes displaying a total number of real estate listings present in the focusing box area, and displaying a larger version of the focusing box area with a listing icon of each real estate listing of the total number of real estate listings, and each listing icon is displayed at a location of the real estate listing on the interactive map area.

15 Claims, 19 Drawing Sheets

(56) References Cited

U.S. PATENT DOCUMENTS

| | | | |
|---|---|---|---|
| 5,623,589 A * | 4/1997 | Needham et al. | 715/853 |
| 5,684,969 A * | 11/1997 | Ishida | 715/800 |
| 5,754,850 A | 5/1998 | Janssen | |
| 5,802,492 A * | 9/1998 | DeLorme et al. | 455/456.5 |
| 5,838,326 A * | 11/1998 | Card et al. | 715/775 |
| 5,852,810 A | 12/1998 | Sotiroff | |
| 5,864,337 A * | 1/1999 | Marvin | 715/708 |
| 5,944,769 A | 8/1999 | Musk | |
| 6,025,844 A * | 2/2000 | Parsons | 715/805 |
| 6,037,936 A * | 3/2000 | Ellenby et al. | 715/764 |
| 6,037,939 A * | 3/2000 | Kashiwagi et al. | 715/798 |
| 6,240,425 B1 | 5/2001 | Naughton | |
| 6,323,885 B1 | 11/2001 | Wiese | |
| 6,397,208 B1 | 5/2002 | Lee | |
| 6,636,803 B1 * | 10/2003 | Hartz et al. | 701/459 |
| 7,149,961 B2 * | 12/2006 | Harville et al. | 715/202 |
| 2002/0075311 A1 * | 6/2002 | Orbanes et al. | 345/764 |
| 2002/0198736 A1 * | 12/2002 | Harrison | 705/1 |
| 2003/0011599 A1 | 1/2003 | Du | |
| 2003/0101063 A1 * | 5/2003 | Sexton et al. | 705/1 |
| 2003/0130924 A1 | 7/2003 | Muldrow | |
| 2004/0021584 A1 * | 2/2004 | Hartz et al. | 340/995.24 |
| 2004/0119759 A1 * | 6/2004 | Barros | 345/853 |
| 2004/0128215 A1 * | 7/2004 | Florance et al. | 705/28 |
| 2004/0257340 A1 * | 12/2004 | Jawerth | 345/157 |
| 2005/0024238 A1 * | 2/2005 | Kimura | 340/995.1 |
| 2005/0203768 A1 * | 9/2005 | Florance et al. | 705/1 |
| 2005/0273354 A1 * | 12/2005 | Adams | 705/1 |
| 2005/0288957 A1 * | 12/2005 | Eraker et al. | 705/1 |
| 2005/0288959 A1 * | 12/2005 | Eraker et al. | 705/1 |
| 2005/0289524 A1 * | 12/2005 | McGinnes | 717/140 |

OTHER PUBLICATIONS

M. Li, M. Qi, *MAPBOT: A web based map information retrieval system*, Information and Software Technology 45 (2003) 691-698.

* cited by examiner

INTERNET BASED INTERACTIVE GRAPHICAL INTERFACE FOR REAL ESTATE LISTINGS

CROSS-REFERENCE TO RELATED APPLICATIONS

This application claims the benefit of U.S. Provisional Application No. 60/863,515 filed Oct. 30, 2006 and U.S. Provisional Application No. 60/942,590 filed Jun. 7, 2007, which are both incorporated by reference herein.

FIELD

The present disclosure relates to a method, system and program for providing an Internet based user interface for property listings and corresponding details. More particularly, the present disclosure relates to a method, system and program for an Internet based graphical user interface for interaction with property listings and corresponding details.

BACKGROUND

Most real estate agents and brokers currently spend a great deal of time and money to maintain a presence on the Internet for exchanging information from agent to clients and/or prospective clients. The terms "agents" and "clients" refer to people (or business entities) who wish buy, sell or participate in a real property transaction, and are a subset of the term "user". The term "user" refers to any individual that is interested in searching real estate property listings. These listings provides a user a limited amount of information concerning select properties offered for sale through the Multiple Listing Service (hereinafter "MLS"). Known property listing web sites provide for real time home searches in databases populated by MLS information, where searching is based on a set of input search criteria. Users generally need to type alpha-numeric data into search fields in order to specify their search criteria. This type of data query can be problematic for users who are unfamiliar with geographic and infrastructure features related to property listings.

As computers and computer networks become more and more able to access a wide variety of information, people are demanding more ways to obtain information. Specifically, people now expect to have access, on the road, in the home, or in the office, to information previously available only from a permanently-connected personal computer hooked to an appropriately provisioned network (i.e., world wide web or Internet). They want to access information via their cell phones, personal digital assistants (PDAs), palm tops, and other wireless devices in a timely and accurate manner via an appropriately provisioned network (i.e., world wide web or Internet). They want information when traveling, whether locally, domestically, or internationally, in an easy-to-use, portable device. In addition to viewing information, people want to be able to search available information according to specific, user defined search parameters. Portability generally requires a device small in size, which in turn limits the number of data entry keys and the amount of memory and available processing power. In addition, ultra portable devices often must be held in one hand or not held at all, so that data entry must be one-handed or no-handed. These limitations in the device generally must be compensated for by the user. For example, the user may have to use a limited keyboard such as a telephone keypad, or limited speech recognition capabilities. The need to fill in several search fields can be cumbersome and difficult for users when searching information via constrained devices, such as cell phones, personal digital assistants (PDAs), palm tops, and other wireless devices.

BRIEF SUMMARY

The present disclosure relates to a method, system and program for providing an Internet based user interface for property listings and corresponding details. More particularly, the present disclosure relates to a method, system and program for an Internet based graphical user interface for interaction with property listings and corresponding details In one embodiment, a method for searching real estate listings utilizing the Internet includes displaying, on a display device, an interactive map area on an Internet web page interactive graphical interface. The interactive map area displays satellite imagery, aerial photo imagery, or a rendered graphic street map. Then the method includes overlaying a focusing box on the interactive map area. The focusing box is movable about the interactive map area and displays a location title indicating a location of the focusing box on the interactive map area and the focusing box defines a focusing box area on the interactive map area. Then the method includes displaying a total number of real estate listings present in the focusing box area, and displaying a larger version of the focusing box area with a listing icon of each real estate listing of the total number of real estate listings, and each listing icon is displayed at a location of the real estate listing on the interactive map area.

In another embodiment, a method for searching real estate listings utilizing the Internet includes displaying, on a display device, an interactive map area on an Internet web page interactive graphical interface. The interactive map area displays satellite imagery, aerial photo imagery, or a rendered graphic street map, and one or more listing icons indicate a location of each one or more real estate listings on the interactive map area. Then the method includes, positioning an active curser on the interactive map area at a particular latitude and longitude coordinate location on the interactive map area. Then the method includes displaying a rapid search icon at the particular latitude and longitude coordinate location on the interactive map area, with a corresponding rapid search tool. The rapid search tool overlays a portion of the interactive map area and is within the interactive map area. The rapid search tool includes a functional list of search or viewing commands. Then the method includes displaying a total number of real estate listings present in the interactive map area, and executing a command from the functional list and reloading the interactive map area on an Internet web page without reloading the entire Internet web page.

In a further embodiment, a method for searching real estate listings utilizing the Internet includes displaying, on a display device, an interactive map area on an Internet web page interactive graphical interface. The interactive map area displays satellite imagery, aerial photo imagery, or a rendered graphic street map, and one or more listing icons indicate a location of each one or more real estate listings on the interactive map area. Then the method includes displaying a favorites box within the interactive map area, without reloading the entire Internet web page. The favorites box includes one or more saved real estate listings. Then the method includes displaying a total number of real estate listings present in the interactive map area.

BRIEF DESCRIPTION OF THE DRAWINGS

The invention may be more completely understood in consideration of the following detailed description of various embodiments of the invention in connection with the accompanying drawings, in which:

FIGS. 7-9 are illustrations of embodiments for managing map markers placed on interactive map area in accordance with the present disclosure;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
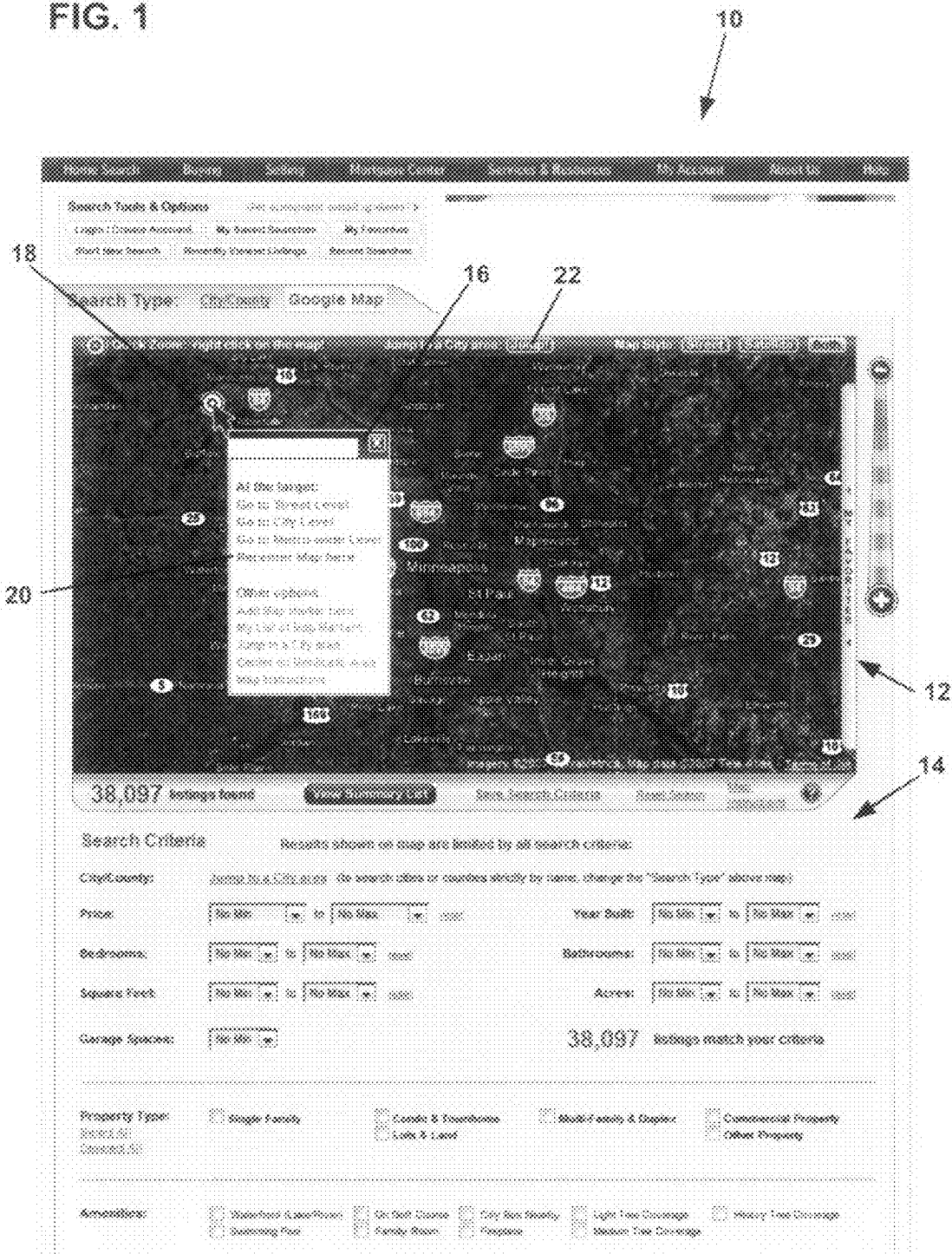
FIG. 1 is an illustration of one embodiment of an Internet based graphical user interface depicting a rapid search tool and a rapid search icon in accordance with the present disclosure.

In the following description, reference is made to the accompanying drawings that form a part hereof, and in which are shown by way of illustration several specific embodiments. It is to be understood that other embodiments are contemplated and may be made without departing from the scope or spirit of the present invention. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Some Internet based property listing services have developed multiple images, including satellite images, aerial photographs, rasterized maps, or any combination of satellite images, aerial photographs, and rasterized maps, that are enhanced with real estate data. The images are configured to allow the user (i.e., client) to zoom in from a large geographical area on the map to a smaller geographical area on the map. At least one data overlay, for example, showing current or near current real estate information, are displayable with the images, creating an interactive map. Internet based, interactive map property listing services do not, at least, provide users with quick, easy to use zoom functions that place a map marker and zoom to particular area via minimal input from users. Once users are provided with search results, known Internet based property listing services allow users to track preferred, or favorite properties and to receive updates, such as, sold status, price changes, escrow status, and the like, in a timely manner. These Internet based property listing services generally require users to save and access favorites in a separate area and/or via separate web pages. Forcing users to access entirely different data and/or web pages in order to access favorites is time consuming and inconvenient. Internet based, interactive map property listing services do not provide users with the ability to place and name favorites locations as unique identifiers directly on the interactive map.

Internet based property listing services can allow agents to view the favorite properties file of the user so that the agent can compare the stated needs of the user with the apparent preferences demonstrated by the user. The agent is better able to serve his user, either by showing properties that are more akin to the favorite properties of the user, or by engaging in further dialogue with the user so as to better determine the user's true needs and desires. The ability of the agent to view the most recent properties that a user has been viewing is similarly valuable. An ability of the agent to search upcoming listings is useful because the agent can then elect to pass on specific upcoming listing information to select users in a most timely manner. Users, in turn, benefit from this personalized service. Internet based property listing services generally require users to fill-in detailed information when requesting more information and/or follow-up contact from an agent on a particular listing. Some users prefer to not share detailed personal information via the Internet. Other users decide against requesting more information and/or follow-up contact from an agent on a particular listing during the time it takes them to provide detailed personal information.

In addition to searching and favorites issues, users are faced with bandwidth and time issues related to searching and loading information for property listings. The need to load and re-load information for displaying search results, detailed information returned in the search, favorites, and the like can cause user confusion and delay. Despite advances in Internet bandwidth speeds, many users experience delays when data is loaded in response to search queries. Internet based property listing services provide generic content to users when they are forced to wait for data to load after launching a search query. Exemplary generic content includes phrases such as "searching," "please wait," an hour glass icon, and the like.

This disclosure describes an Internet based method, system and program that allow users to conduct real time real estate searches by specifying search parameters via visual and/or geographic features. This disclosure also describes an Internet based method, system and program that provides users with quick, easy to use zoom functions that place a map marker and zoom to a particular area via minimal input from users. This disclosure also describes a method, system and program that allows users to save and access information about favorite properties within the same visual area and/or web page. This disclosure also describes a method, system and program that allows users to place and name favorites locations as unique identifiers directly on the interactive map. This disclosure also describes a method, system and program that allows agents to capture user email addresses in relation to a particular property before requiring other detailed personal information. This disclosure also describes a method, system and program that allows agents to provide marketing and/or advertising content to users during delays in loading data in response to search queries.

One concern for many online resources is the ability to provide relevant and appropriate information to the user. In the context of online property listings, users are often most interested in quickly and efficiently identifying those properties which meet their own pre-established criteria. Typically, this criteria includes a particular geographic region, a price range, and certain property needs. For example, user's needs may include a minimum number of bedrooms, number of bathrooms, a specific age of the home, etc. The typical method for handling a particular user's search needs is to direct the user to a search tool of some type, which allows them to input their own search criteria. While this methodology is effective, it requires movement to a separate search screen, and additional steps in navigating to the desired location. Naturally, alternative tools made available to the user that can quickly and easily focus their search are beneficial. Such tools should provide the ability to focus on the most relevant search criteria necessary. In addition, it is beneficial to provide tools that are straight forward and easy to use.

In addition, many real estate Internet listing sites do not provide a simple and effective method for narrowing a search. In many situations, search criteria input by a user may result in an unreasonable number of search results or "hits". In response, the user is typically required to go back and further limit their search in some way. Often, this requires the user to go back to a search criteria input screen and modify the previously input values. As can be anticipated, this is cumbersome and inefficient as it requires the user to jump back and forth between search criteria and the search results without an organized methodology.

Thus, this disclosure describes an Internet method, system and program that allow users to easily modify and narrow their search, when the search results are unmanageable. This methodology should necessarily avoid the movement back to a search criteria input screen.

The present disclosure provides a more efficient Internet based method of performing searches and managing search results. More specifically, the present disclosure provides a mechanism which will easily allow a user to graphically generate a search of property listings, or to narrow a search when an undesirable or excessive number of hits are obtained. Generally, speaking, this disclosure makes use of a geographic focusing or zooming box which is used in conjunction with maps of a particular region. In one embodiment, the user will be provided with a map of a desired area, and can use the focusing box to initiate a property search using this tool. In another embodiment, the zooming box is used when an excessive number of properties are found during a search, and further narrowing is necessary.

In order to most efficiently direct a user to relevant property listings, the Internet based interface of the present disclosure provides a search tool which is immediately available to a user at an introductory page of the online resource, and is easily utilized to generate a property search. This search tool is presented in a graphical nature, which is very easily understood and very effective for the anticipated search activities. This initial search tool also allows the user to input certain high level criteria, and provides immediate feedback related to the entered criteria. Once satisfied with the original set of criteria entered, the user is then directed to graphical search results and search modification pages which allow for the presentation of more detailed information and the ability to further modify search results. While this tool is immediately available to the user, it could be utilized at virtually any point in the search process, including pages reached at subsequent points of the users search activities.

In a situation where a search has returned an excessive number of results, the user is notified of this fact and provided with tools to more easily focus their search. In this particular situation, the search is easily focused on a more specific geographic region using a zoom box in conjunction with a map illustrating the previously searched region. The zoom box then simply limits the geographic region being searched. Most significantly, the previous search criteria is maintained and the user is not required to go back to reenter previously entered search criteria values.

Enhanced aerial imagery systems, including one or more user computers, each of which includes a browser program module configured to allow user computers to access and exchange data with the Internet, including web sites within the World Wide Web portion of the Internet (or via another network such as a WAN or LAN, cellular phone network, etc.), are known. User computers may include one or more central processing units or other logic processing circuitry, memory, input devices (e.g., keyboards and pointing devices), output devices (e.g., display devices and printers), and storage devices (e.g., fixed, floppy, and optical disk drives), as are known to those skilled in the art. User computers may also include other program modules, such as an operating system, one or more application programs (e.g., word processing or spreadsheet applications), and the like.

Aerial mapping and property listing processes are conducted by another system that is coupled to the Internet. At least one enhanced imagery database, connected to the additional system, stores data exchanged between user computers and at least one agent computer under the enhanced aerial imagery system. One skilled in the art can appreciate that data used in the enhanced aerial imagery system can also be provided from other sources. Each agent computer is similar to the user computers, and includes a browser to permit the agent computer to access and exchange information with the Internet.

The enhanced imagery database is populated with geographic and visual feature data via a map server that can correlate map data with property listing data for users, agents or other individuals concerned with property listing information. In some embodiments, the map server handles various functionality, including allowing a user to zoom in and out on an enhanced aerial map. The scope of the high level maps may range from a single property to the whole world. The map server may also provide miscellaneous tools, such as a graphical tool that allows a user to select an area of interest, as described below.

The interactive graphical representation described herein can be created for an Internet website using known Internet website programming software. For example, Linux based architecture can utilize open source Internet website programming software available under the trade designation PHP from Zend.com and/or MY SQL DATABASE from MYSQL.com. Microsoft based architecture can utilize similar Internet website programming software available from Microsoft Corp at Microsoft.com.

The Internet based interactive graphical representation and method described herein and created (i.e., programmed) as described above, and can be embodied on a computer readable medium. This medium can be accessed and utilized by a computer (i.e., any device operating with a microprocessor and the like) via the Internet (i.e., an Internet web site web page). The computer is operably connected to the display device and capable of presenting Internet data to the display device and capable of receiving input commands from a user via an input device. Thus, users perform the method steps described herein with a display device (e.g., a computer display, a cellphone display, a GPS display, and the like,) utilizing an input device (e.g., a mouse, a pointing device, a touch screen, voice input device, and the like).

Referring to FIG. 1, there is shown an Internet based interactive graphical representation 10 of property listings in accordance with the present disclosure. This interactive graphical representation 10 is displayed as an Internet web page on an Internet website. In some embodiments, the interactive graphical representation includes only an underlying map layer made up of satellite imagery, aerial photo imagery, a combination of both, rendered graphic street map (as illustrated), a combination thereof, and the like. Those skilled in the art can appreciate that imagery data sources are often referred to as "Digital Orthorectified Quadrangles" (DOQs). Digital orthography is the process by which images are adjusted to account for elevation changes so that aspects of the image can line up appropriately. For example, the United States Geological Survey (USGS) has been making high-resolution imagery of this type available on a city-by-city basis. In addition, many private companies provide such imagery.

In some embodiments, the Internet based interactive graphical representation 10 is imported into the system of the present disclosure using one or more tools. For example, one or more tools may break down large image files into many smaller files (e.g., "map tiles") and generate an index file to help locate the many smaller map tiles. The map tiles may go through some additional post-processing prior to use, such as coloring the water or re-coloring the map, or adding additional layers to the tiles. In some embodiments, map tiles need to be image files. Rather they can be any information/data that facilitates the electronic display of one or more interactive graphical representations 10. An interactive graphical representation 10 displayed on a screen may include one or many map tiles.

In some embodiments, map tiles are flattened, two-dimensional images of a round (i.e. three-dimensional) Earth. The mathematical function for transforming a 3-D surface to a 2-D one is sometimes called a "projection". Aerial images are stored in projections that cover relatively small areas localized to a given city, region, or state. This allows the flattened map tiles to represent the 3-D earth as accurately as possible. Additional point and vector layers (e.g. data overlays) may be added to the interactive graphical representation 10. These layers can be stored in the same mathematical projection as the interactive graphical representation 10, but more likely will be stored in either the original 3D coordinate system (latitude/longitude) or a completely different mathematical projection entirely. In order to accurately overlay these points and vectors on the aerial images, all points are transformed in real-time from their original coordinate space to the map tile projection coordinate space.

In some embodiments, map tiles may be created at various resolutions to enable effective zooming in/out. For example, each time a user zooms in on a interactive graphical representation 10, a new set of map tiles (e.g., a three-by-three square of nine map tiles configured at a higher resolution and covering less geography) may replace an earlier set of map tiles (e.g., a three-by-three square of nine map tiles configured at a lower resolution and covering a greater geographical area). To enable quick exchange of map tiles, the one or more tools may request information about relevant map tiles and then cache such information for later use. For example, while displaying information at one resolution, the one or more tools may anticipate that the user is going to want to zoom in and accordingly, request and cache a next higher resolution of map tiles. Likewise, the one or more tools may request adjacent map tiles and store and cache them in anticipation of a user performing "panning" on a currently displayed interactive graphical representation 10. In this way, users can experience near seamless panning, zooming, etc., despite the fact that images may themselves include large amounts of data. Thus, an active curser can be positioned on the map area such that a user can "drag" or move the map area to view other portions of the map area, without reloading the entire Internet web page that is displayed the interactive map area window.

Likewise, some overlays may be based on vector information and may provide displays of lines (as in the case of roads) and polygons (parcel outlines, park boundaries, state boundaries, etc.) on top of a map layer. For example, information about neighborhoods, boundaries, roads, bodies of water, parks, schools, and the like, may all be defined and illustrated using vectors. Additional vector layers may be added when available.

Referring again to FIG. 1, interactive graphical representation 10 includes a divided view having an interactive map area 12 and a search criteria area 14. In many embodiments, the interactive map area 12 has a fixed area or boundary or window size, as illustrated. Search criteria area 14 includes multiple search fields, such as fields for price ranges, number of bedrooms, square footage, number of garage spaces, year built, number of bathrooms, acreage, and the like. The interactive map area 12 can also display a total number of real estate listings presently displayed on the interactive map area 12.

Figure 2:
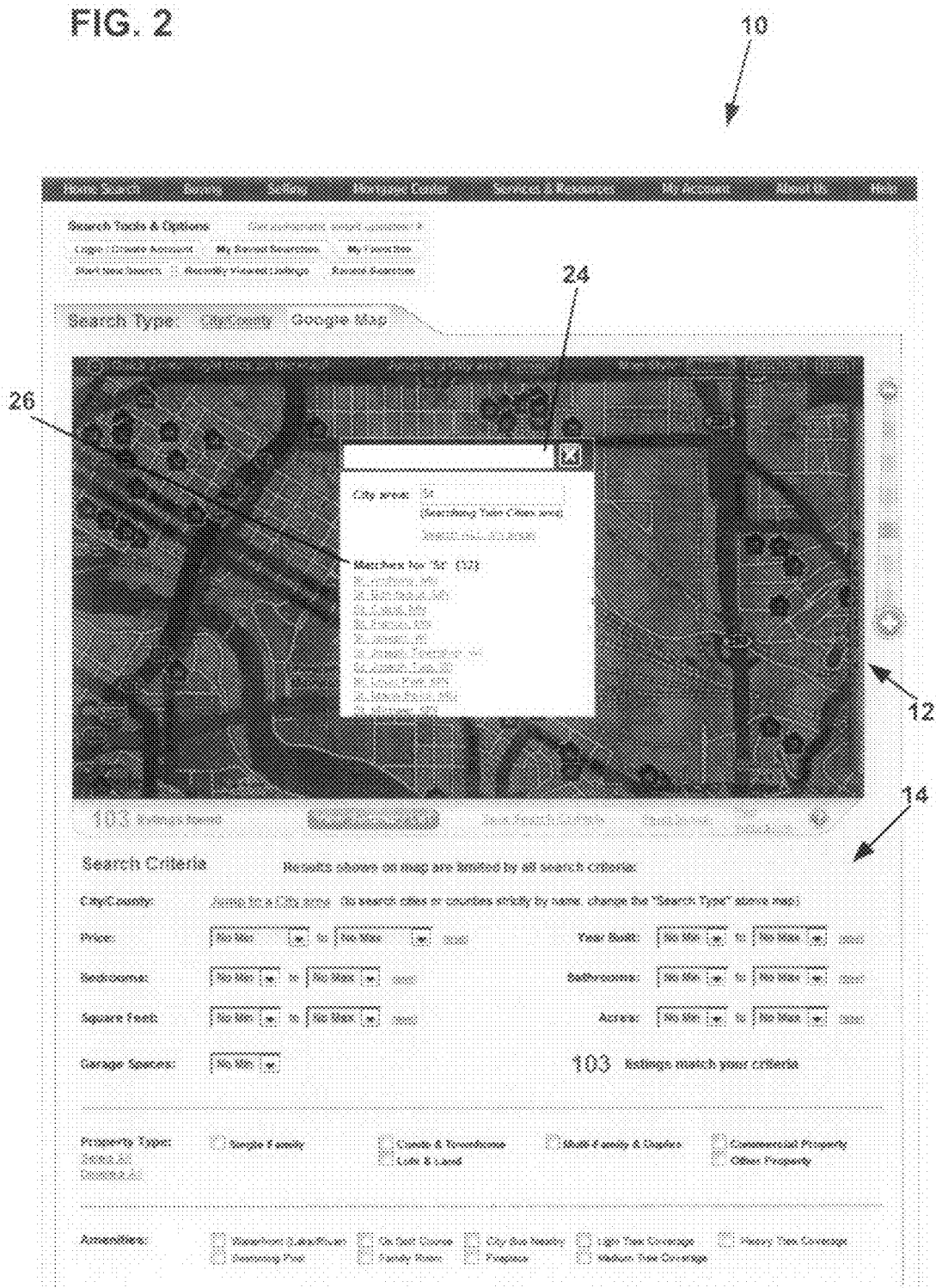
FIG. 2 is an illustration of a search box used in combination with the graphical user interface shown in FIG. 1.
Figure 3:
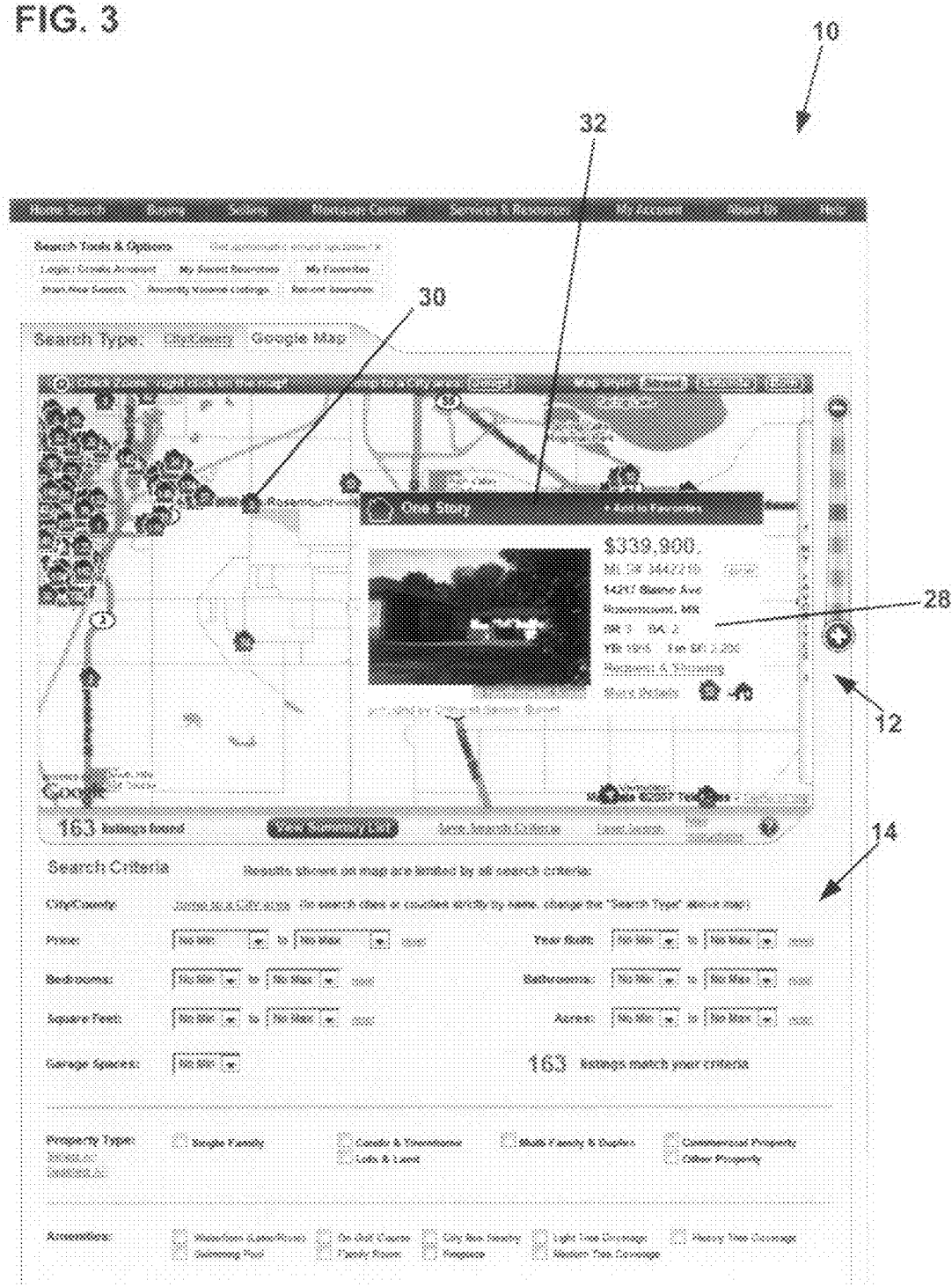
FIGS. 3-6 are illustrations of embodiments of favorites screens for providing users with the ability to save and access information about favorite properties within an interactive map area in accordance with the present disclosure.

Referring still to FIG. 1, interactive map area 12 includes a rapid search tool 16. Rapid search tool 16 is used in combination with a corresponding rapid search icon 18. Users use rapid search tool 16 and rapid search icon 18 to center interactive map area 12 to particular latitude and longitude coordinates and zoom to a particular elevation with minimal input. In one embodiment, the user positions an active cursor at a particular point in the interactive map area 12 and provides an input (e.g. key stroke, mouse click, etc.) to indicate that this point is the desired center point. Upon receiving the user input, the system of the present disclosure places (i.e., displays) the rapid search icon 18 at the designated point and/or overlays the rapid search tool 16 at a portion of the interactive map area 12 and provides a functional list 20, including various activities or commands related to searching interactive map area 12 for property listings, saved property listings and the like. Illustrative functional list 20 commands includes, for example, "Go to Street Level", "Go to City Level", "Go to Metro-wide Level", Recenter Map here", "Add Map Marker here", "My List of Map Markers", and "Jump to a City area". Rapid search icon 18 can be any type of icon, including various colors, shapes, letters, and the like. Once rapid search icon 18 appears in interactive map area 12, the user can select an elevation or zoom level by providing a second input (e.g. key stroke, mouse click, etc.) to the system. The elevation or zoom level can be a predetermined system level, a user defined level, and/or a combination of both. User defined elevations can be selected via the rapid search tool 16. Executing a command from the functional list 20 reloads the interactive map area 12 on the Internet web page without reloading the entire Internet web page, as illustrated in FIG. 1-3.

FIG. 1 shows that user defined elevations can be selected based on elevations necessary to view particular geographic and/or infrastructure features, such as street names, an entire city, or an entire metropolitan area. Those skilled in the art can appreciate that various elevation criteria can be included in rapid search tool 16 for assisting users in selecting an elevation or zoom level. In one embodiment, users can customize their rapid search tool 16 to display their preferred elevation criteria and the like. Interactive map area 12 is automatically adjusted such that rapid search icon 18 is located at the center of interactive map area 12 and geographic features are displayed at the selected or predetermined elevation or zoom level.

Referring again to FIG. 1, rapid search tool 16 also includes functional list 20. Functional list 20 provides a listing of activities related to searching interactive map area 12. FIG. 2 depicts activities including adding a map marker, viewing a list of map markers, moving interactive map area 12 to view a city area, centering interactive map area 12 on a predetermined area, and providing further map instructions. Those skilled in the art can appreciate that functional list 20 can include these and other activities, including but not limited to naming map markers, setting up a color code system, and the like.

Interactive map area 12 also includes a jump button 22 for providing a quick, focused search that will move interactive map area 12 to a specified area. FIG. 1 depicts jump button 22 providing a quick focused search on particular cities. Those skilled in the art can appreciate that jump button 22 can provide a quick, focused search based on various geographic and/or infrastructure features, including but not limited to school districts, counties, states, and the like. Referring now to FIG. 2, once a user selects jump button 22, a search box 24 appears within interactive map area 12. The user inputs search criteria and a list of matching items appears in a lower portion of search box 24. As the user inputs increasingly specific search criteria, the list of matching items is narrowed to include the most relevant matches. A total number of property listings corresponding to the matching items is provided next to a search summary line 26. The number of property listings corresponding to the matching items increases and decreases depending on the specificity of the user's input criteria.

Referring still to FIG. 2, once the user selects a particular matching item from the list of matching items, interactive map area 12 is automatically centered on that matching item at a particular elevation or zoom level. For example, if the user selects "St. Anthony, Minn.," interactive map area 12 will automatically depict St. Anthony, Minn. with the geographic center of that city positioned at the center of interactive map area 12. As previously discussed, the elevation or zoom level is preset in order to provide the user with a view of the entire city of St. Anthony, Minn. If the user were to search for property listings correlated with a particular street, the elevation or zoom level would be lower to provide greater map details. Conversely, if the user were to search for property listings correlated with a particular county, the elevation or zoom level would be higher to provide fewer map details.

Referring now to FIGS. 3-6, there are shown embodiments of favorites screens for providing users with the ability to save and access information about favorite properties within an interactive map area in accordance with the present disclosure. FIG. 3 shows a listing box 28 that is accessed when a user hovers over a listing icon 30 representing an individual property listing on interactive map area 12. FIG. 3 depicts listing icon 30 as a house. Those skilled in the art can appreciate that listing icon 30 can be any type of icon used to represent an individual property listing, including but not limited to figures, letters, words, numbers, and the like. FIG. 3 also depicts color coding of listing icons 30. For example, in one embodiment, listing icons 30 that are blue might depict property listings that have not been accessed by a user while listing icons 30 that are red might depict property listings that have been accessed by a user and listing icons 30 that are green might depict property listings that have been saved as a favorite property listing. In this manner, users can readily see new property listings, saved property listings, etc., when simply viewing a map in interactive map area 12 without the need to access data related to the property listings. Those skilled in the art can appreciate that various colors, sizes, shapes, etc., can be added to listing icons 30 to aid users in viewing maps in interactive map area 12. The term "property listing" as used herein means properties that are or have been offered for sale, including sold properties, properties pending sale, properties that are actively for sale, and the like, properties that are or have been offered for rent and/or lease, properties for which foreclosures have been or are being commenced, and the like. Those skilled in the art can appreciate that users can select different icons, colors, symbols, letters, words, etc. to designate these various types of properties defined as property listings.

Referring again to FIG. 3, listing box 28 includes some information about a particular property listing, including but not limited to price, MLS number, address, number of bedrooms, number of bathrooms, year built, finished square feet, request for a showing with an agent, more details on the property listing, and the like. In one embodiment, users can customize the information shown in listing box 28 for individual property listings. For example, if a user is interested only in homes having fireplaces, swimming pools, two stories, or other such features, he or she can request that this information be shown in listing box 28 in order to save time and effort when viewing property listings in interactive map area 12. FIG. 3 also includes an add to favorites button 32, which allows a user to save a property listing to his or her favorites file without the need to access more detailed information about the listing.

Figure 4:
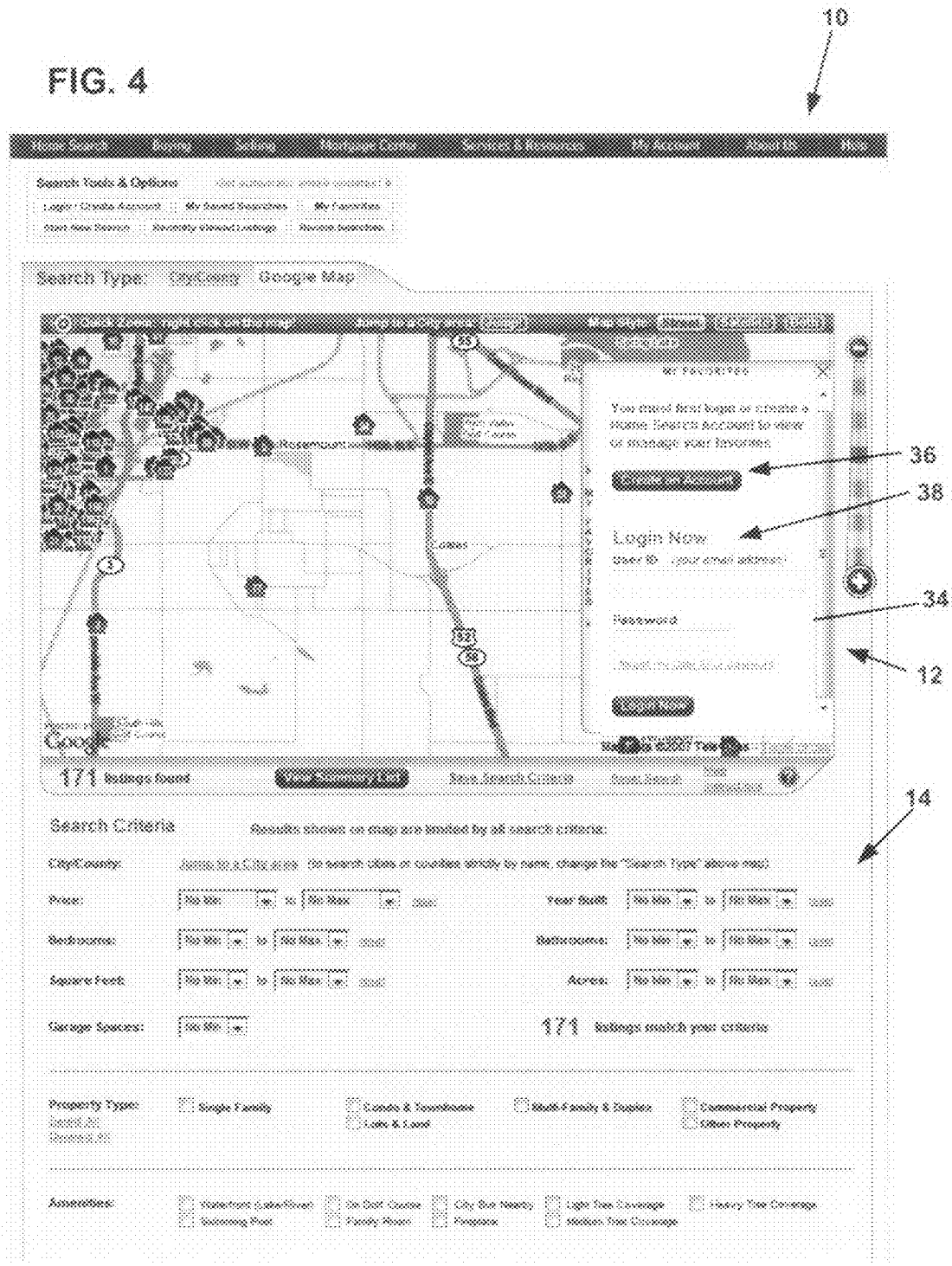

Once a user selects a property listing to save to his or her favorites file, a login box 34 appears in interactive map area 12 as depicted in FIG. 4. Login box 34 includes an area for creating an account 36 in the event that a user has not previously established an account. Login box 34 also includes a separate area for logging in 38 when users have previously established an account. Area for logging in 38 depicted in FIG. 4 shows a field for users to type their email address as a user. Those skilled in art can appreciate that any unique identifier can be used as a user. The login box 34 can be displayed without reloading the entire Internet web page.

Figure 5:
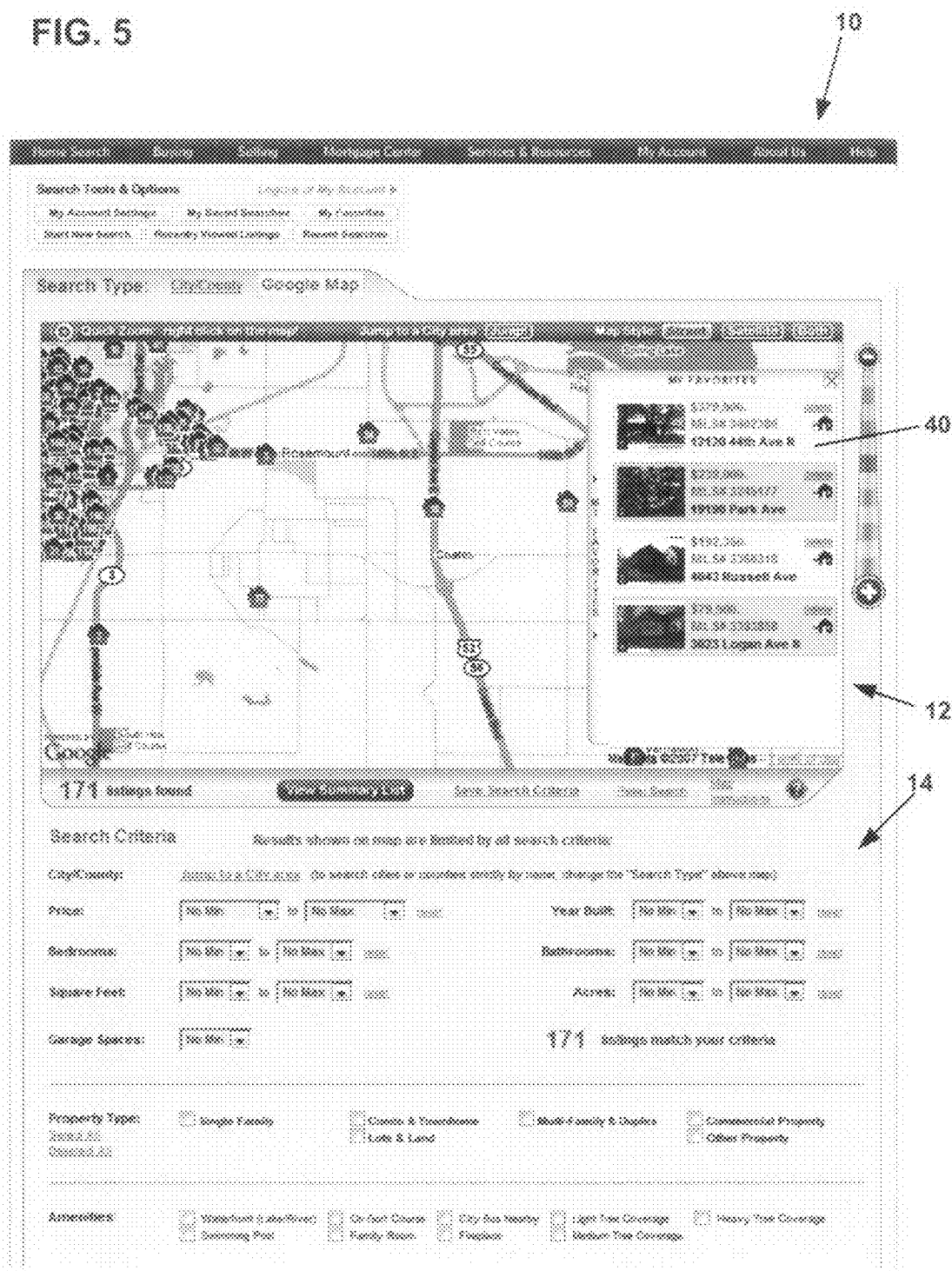

FIG. 5 depicts a favorites box 40 for displaying a list of property listings included in a user's favorites files after the user has created an account and/or logged in to his/her account. Favorites box 40 is opened within interactive map area 12. In one embodiment, favorites box 40 is moveable within interactive map area 12 so users can see map details and their favorites listing simultaneously. Positioning favorites box 40 within interactive map area 12 provides convenience to users, saves space on the screen and avoids routing users to separate web pages, thereby requiring less data to be loaded, which saves time for users. Favorites box 40 shown in FIG. 5 provides small property listings with particular information, including but not limited to thumbnail photograph of property, price, MLS number, and street address. Those skilled in the art can appreciate that a variety of information can be included in favorites box 40. In one embodiment, this information is customizable by the user. In another embodiment, this information is predetermined and standard for all users. The type of information listed in favorites box 40 can be altered depending on the selected elevation or zoom level.

Figure 6:
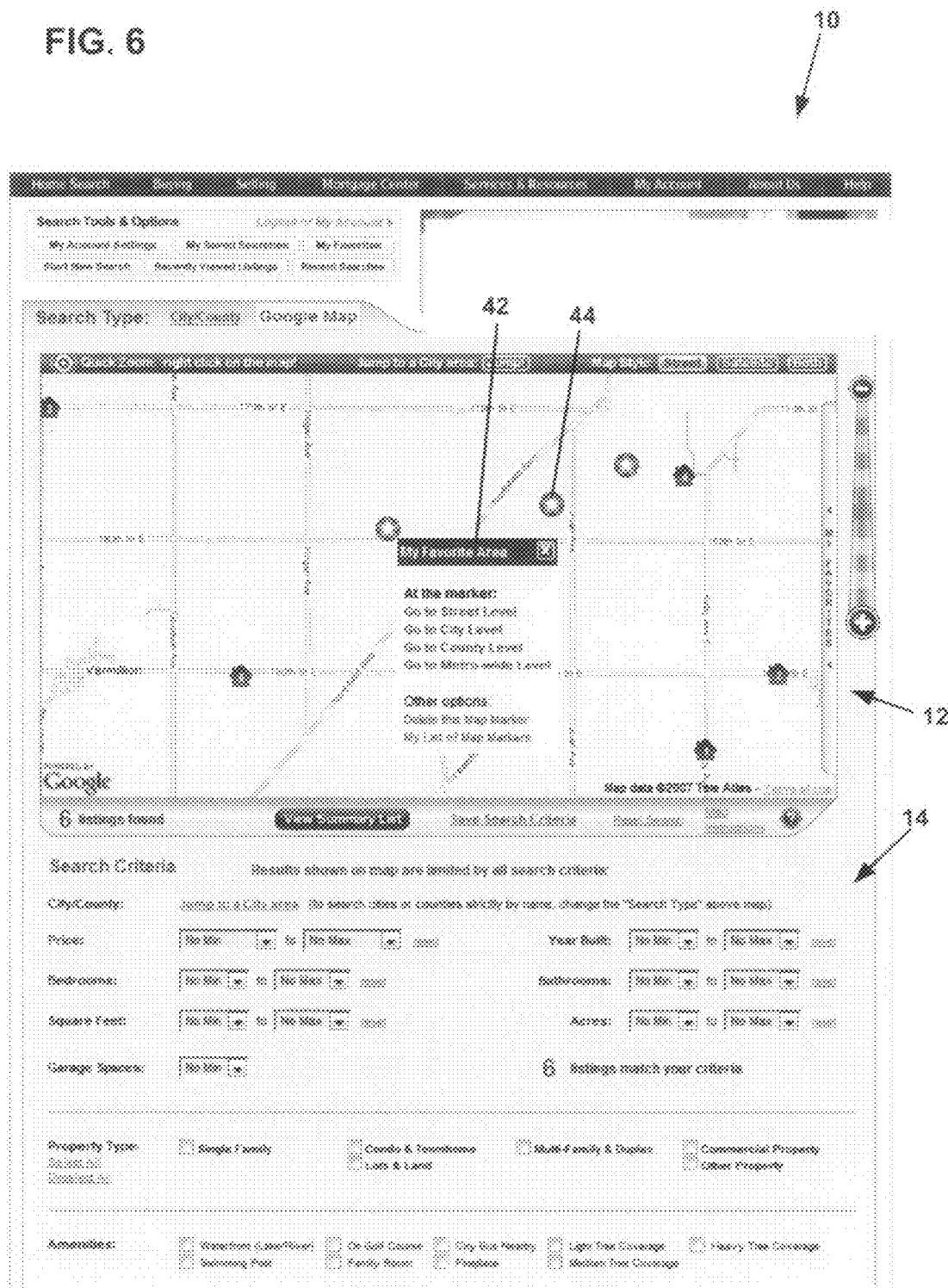
Figure 8:
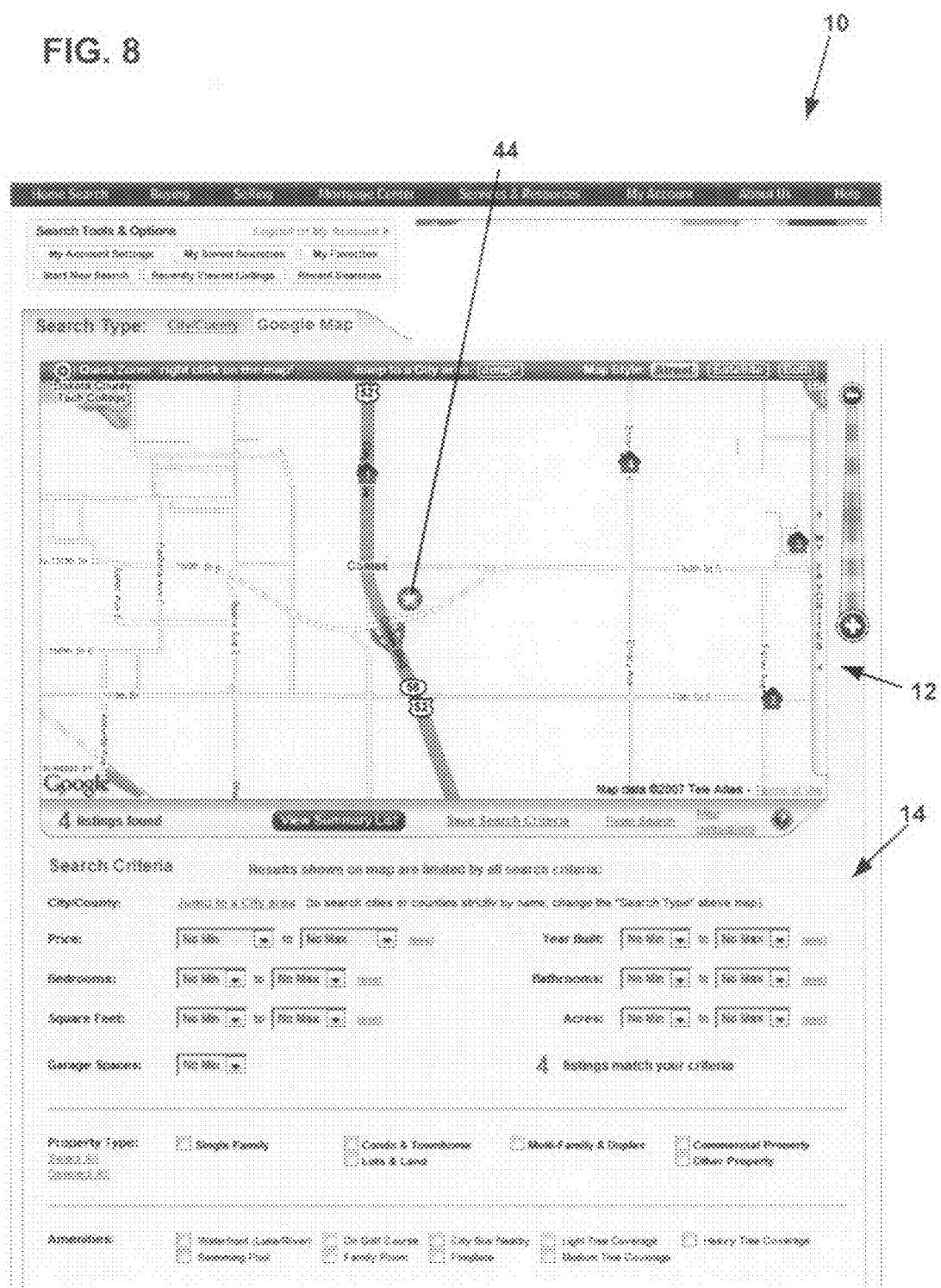

Referring now to FIG. 6, there is shown a favorites area box 42 positioned within interactive map area 12. Again, positioning favorites area box 42 within interactive map area 12 provides convenience to users, saves space on the screen and avoids routing users to separate web pages, thereby requiring less data to be loaded, which saves time for users. Favorites area box 42 is accessed by hovering over a map marker 44 placed on the map within interactive map area 12. Map marker 44 can be any type of icon as depicted in FIG. 8, including various colors, shapes, letters, and the like. In one embodiment, map marker 44 is linked to a user's favorites files, such that each individual property listing saved in a user's favorites file is depicted by a map marker 44 on a map in interactive map area 12. In another embodiment, map markers 44 are not tied to a particular property listing and, as such, are not automatically linked to a user's favorites files.

Referring still to FIG. 6, favorites area box 42 includes an activities list whereby users have quick access to a select number of options of activities related to property listings they have designated with map markers 44. FIG. 6 shows that the activities list includes a list of activities to be conducted at an individual map marker 44, such as altering the elevation or zoom level (e.g. street level, city level, county level, metro-wide level) and, and separate activities listed as other options, such as deleting a map marker 44 and showing the user's list of map markers 44. The activities listed in FIG. 6 are exemplary. Those skilled in the art can appreciate that a variety of different activities can be associated with favorites area box 42, including but not limited to user customized activities.

Figure 7:
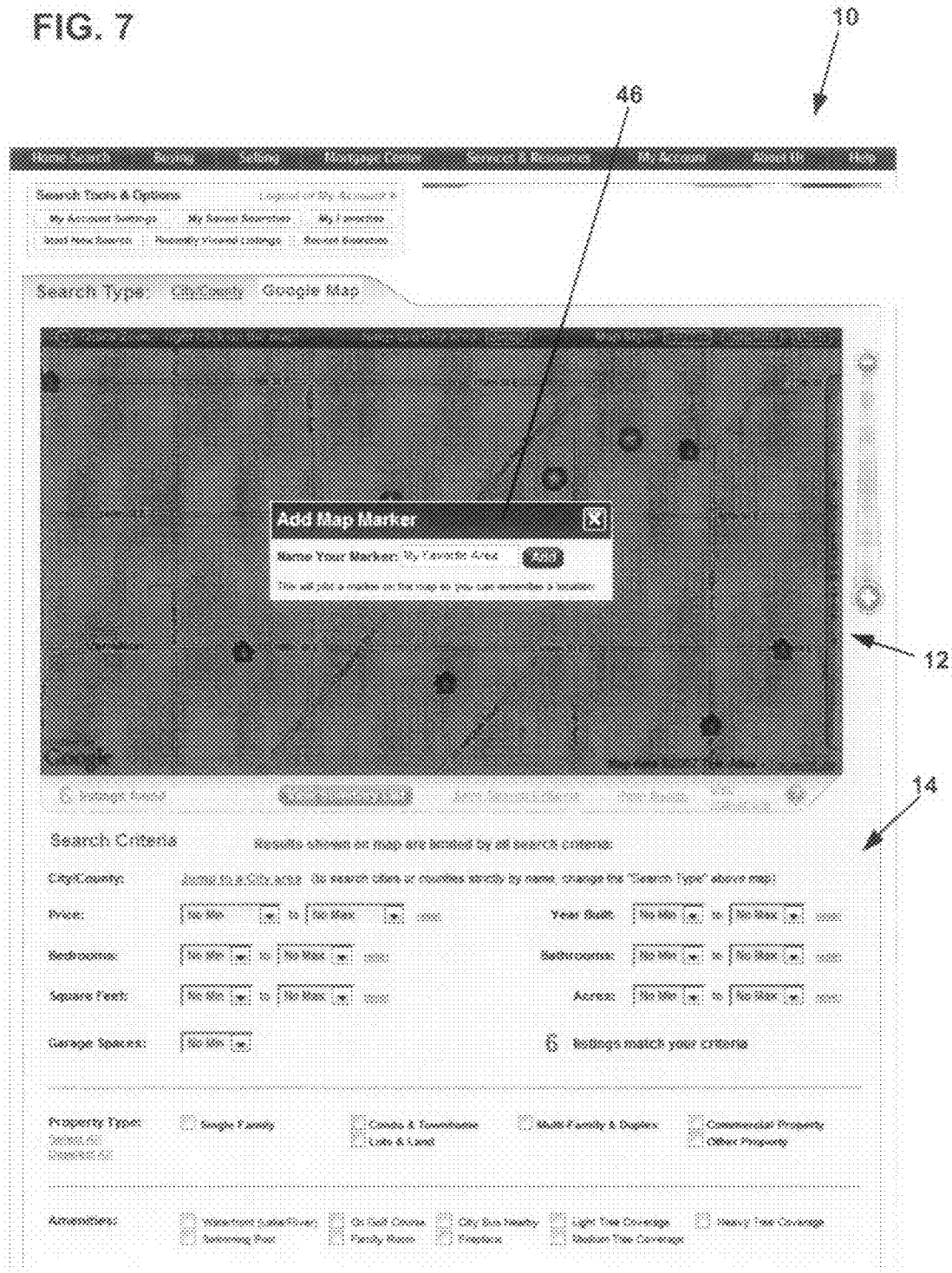

Referring now to FIG. 7, there is shown a map marker creation box 46 positioned within a map in interactive map area 12. Map marker creation box 46 is accessed when a user selects the option of adding a map marker to a particular location on a map within interactive map area 12, as shown in functional list 20 in FIG. 1. In this embodiment, users are prompted to name individual map markers 44 as they are being created. In this manner, users are likely to remember particular map locations via specially named map markers 44. While FIG. 7 depicts users naming map markers 44 with alpha numeric names that can be input into map marker creation box 46, those skilled in the art can appreciate that symbols, colors, letters, and the like can be used to name map markers 44.

Figure 10:
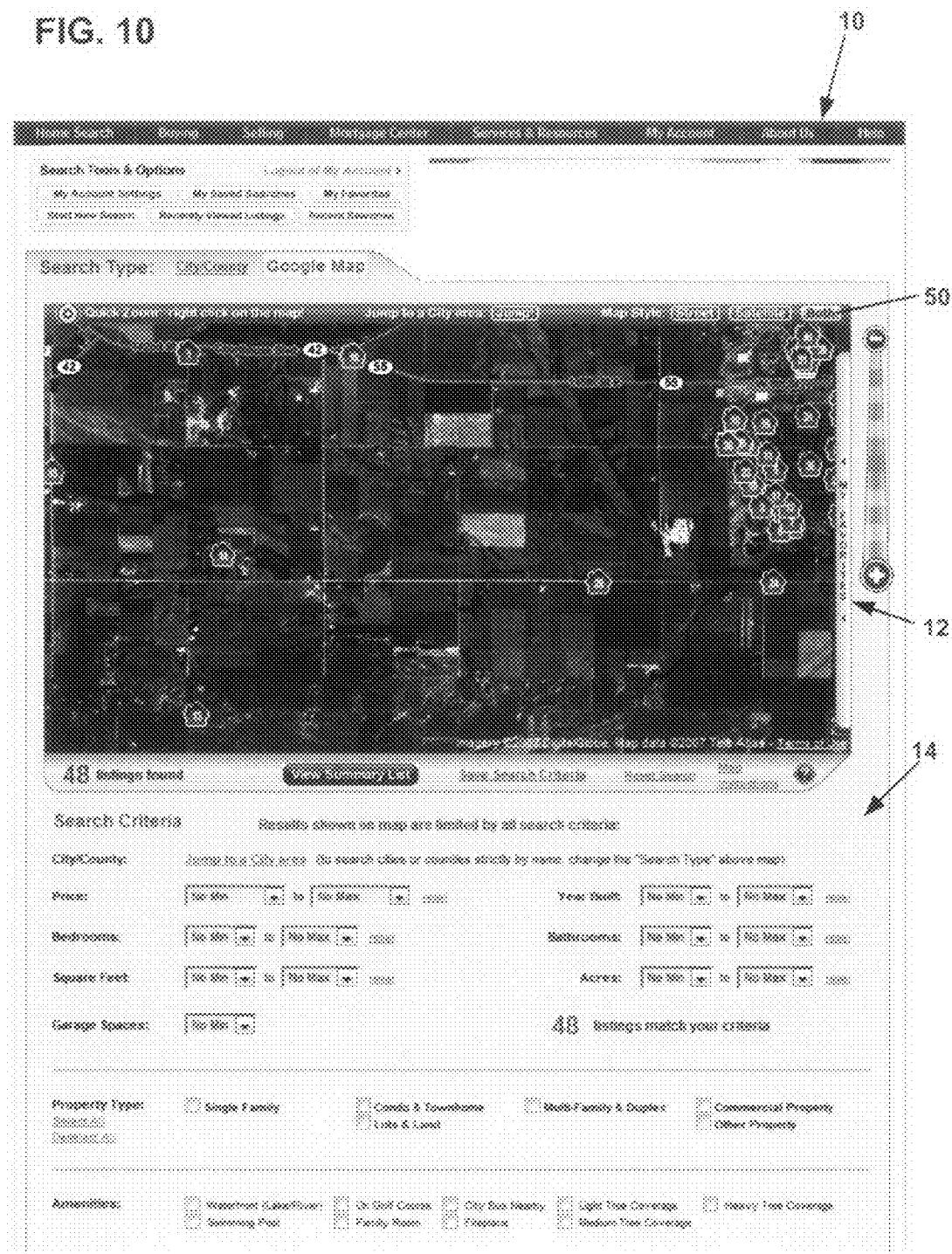
FIG. 10 is an illustration of graphical user interface depicting a map in interactive map area.
Figure 11:
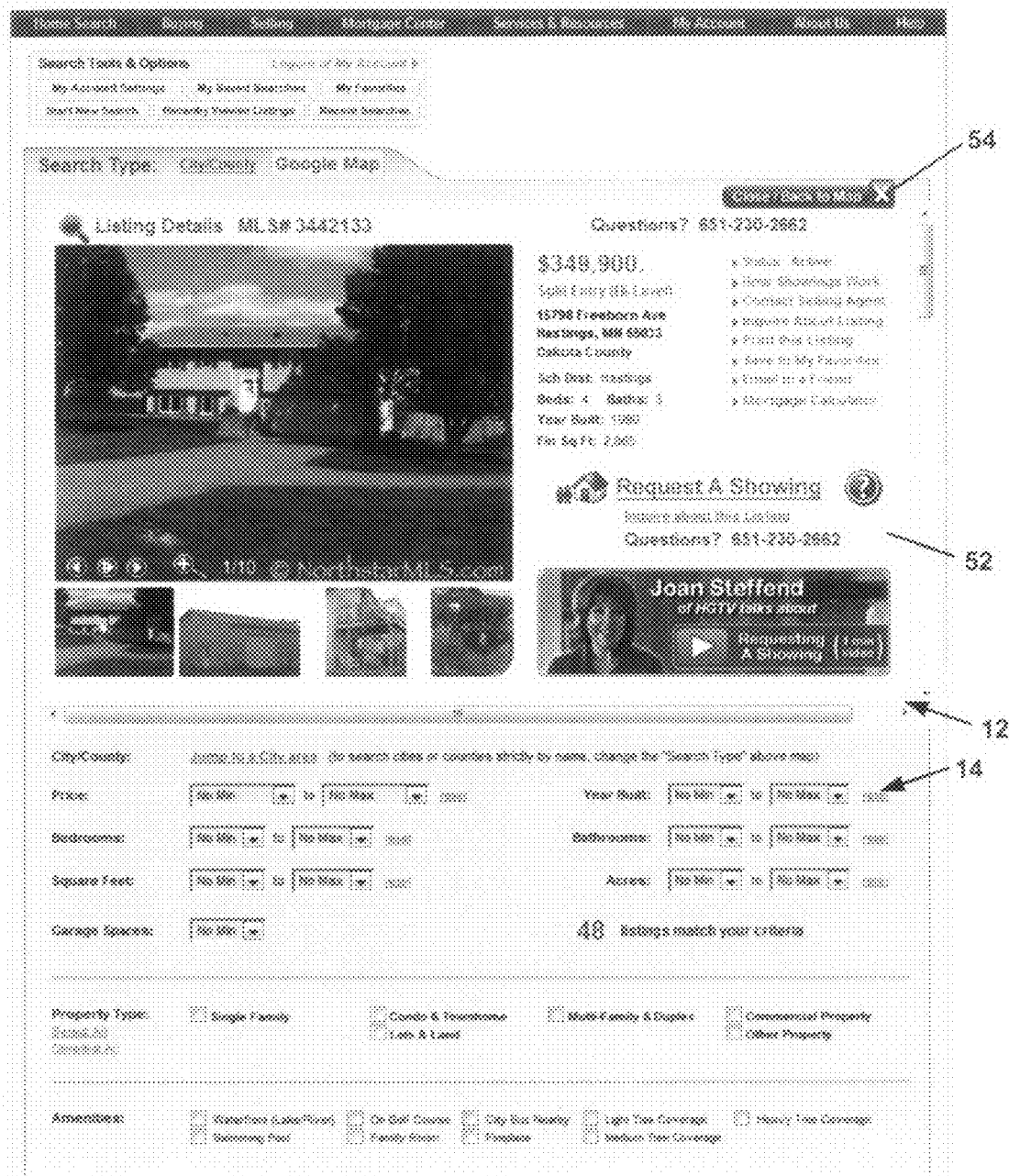
FIG. 11 is an illustration of graphical user interface depicting a property listing in interactive map area.

FIG. 9 depicts a map markers list 48 that can be accessed via favorites area box 42 as shown in FIG. 6. In other embodiments, map markers list 48 can be accessed from a plurality of lists, including but not limited to functional list 20 in rapid search tool 16. Map markers list 48 includes a list of map marker names as created by the user, a designation of the closest city to named map marker 44, a link to jump to the individual map marker 44 associated with each map marker name, and a delete button so users can easily remove named map markers from map markers list 48. Again map markers list 48 is positioned within interactive map area 12 to provide convenience to users, save space on the user's screen and avoid routing users to separate web pages, thereby requiring less data to be loaded in order to save time for users. FIGS. 10 and 11 show interactive map area 12 being populated with map data 50 and/or detailed property listing data or details 52. Referring specifically to FIG. 11, detailed property listing data or details 52 is scrollable within interactive map area 12. Because detailed property listing data or details 52 is loaded within interactive map area 12, users are not routed to separate web pages and web-based content for the frame of the current web page and search criteria area 14 does not change, thus the web-based content of the Internet web page is not completely reloaded when the detailed property listing data or details 52 is loaded into the interactive map area 12. Accordingly, users can simply select a close detail button 54 to wipe detailed property listing data 52 off of map data 50 in order to resume searching the map within interactive map area 12 at the same geographic coordinates and/or elevation or zoom level as the user had viewed before accessing detailed property listing data 52. Thus the web-based content of the Internet web page is not completely reloaded when the detailed property listing data or details 52 is removed from the interactive map area 12 and replaced with the prior map data. In this manner, user are not routed to several different web pages and content delivery is minimized, thereby providing users with quicker and more convenient search and access functionality.

Figure 12:
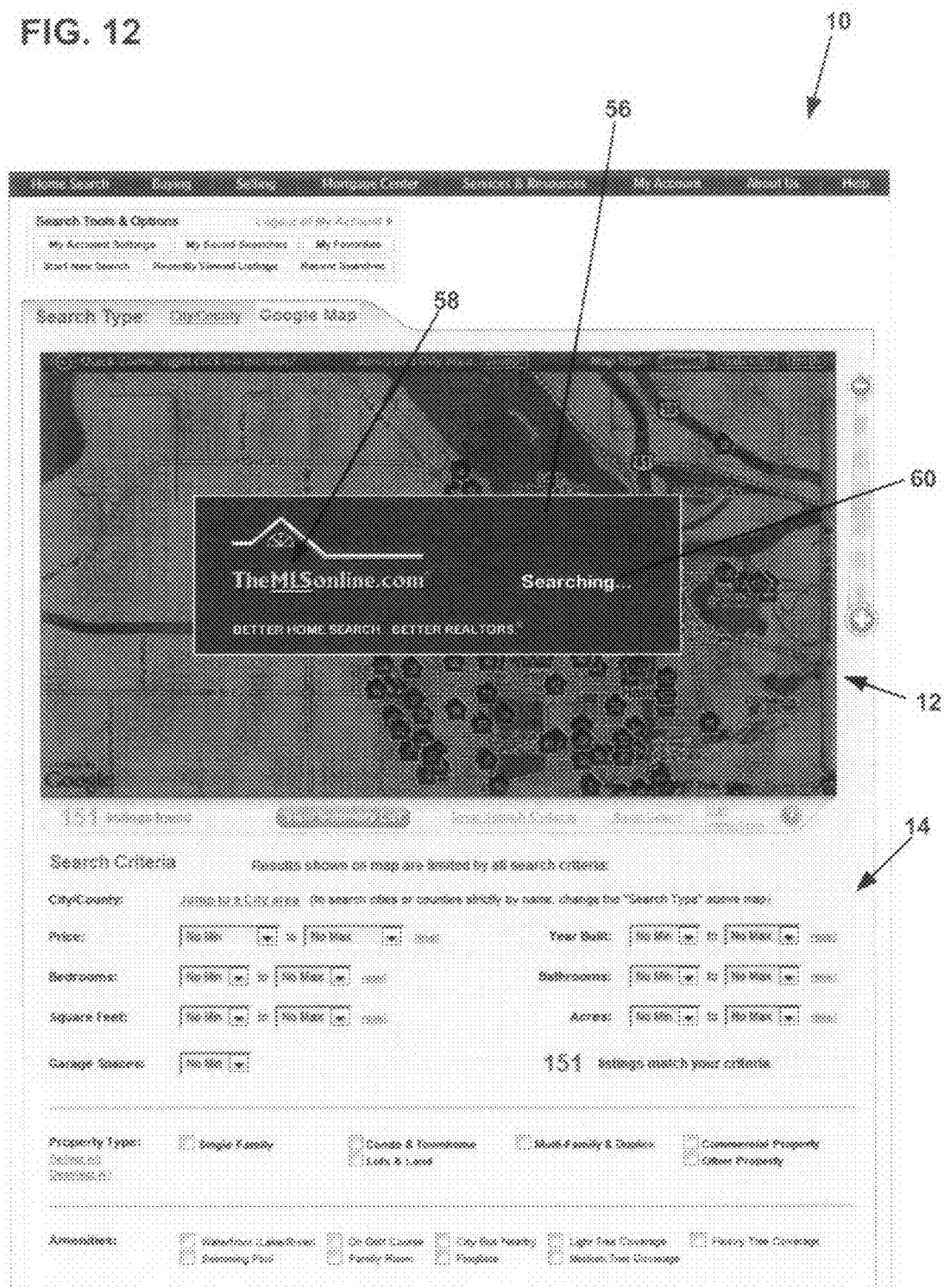
FIG. 12 is an illustration of marketing and/or advertising content displayed to users during delays in loading data in response to search queries.

Referring now to FIG. 12, there is shown a search delay box 56 within interactive map area 12. Search delay box 56 provides one area for displaying advertising and/or marketing content for agents. FIG. 12 depicts a logo and slogan for an Internet based property listing service provider. Those skilled in the art can appreciate that various advertising and/or marketing content can be inserted in search delay box 56, including but not limited to advertising and/or marketing content supplied from mortgage brokers, construction companies, security companies, and the like. In this manner, time delays caused when data is being loading and/or when users move the map within interactive map area 12 can be used for advertising and/or marketing purposes. In one embodiment, links to third party service providers' web sites can be provided as part of advertising and/or marketing content 58. If users accessed these links, the third party service providers' web page could be loaded in a new window allowing users the opportunity to review other information while waiting for data and/or file transfers. Additionally, search delay box 56 can also include an area for generic content 60, such as searching, please wait, an hour glass icon, and the like, to notify users that they are experiencing a delay in the system.

Figure 13:
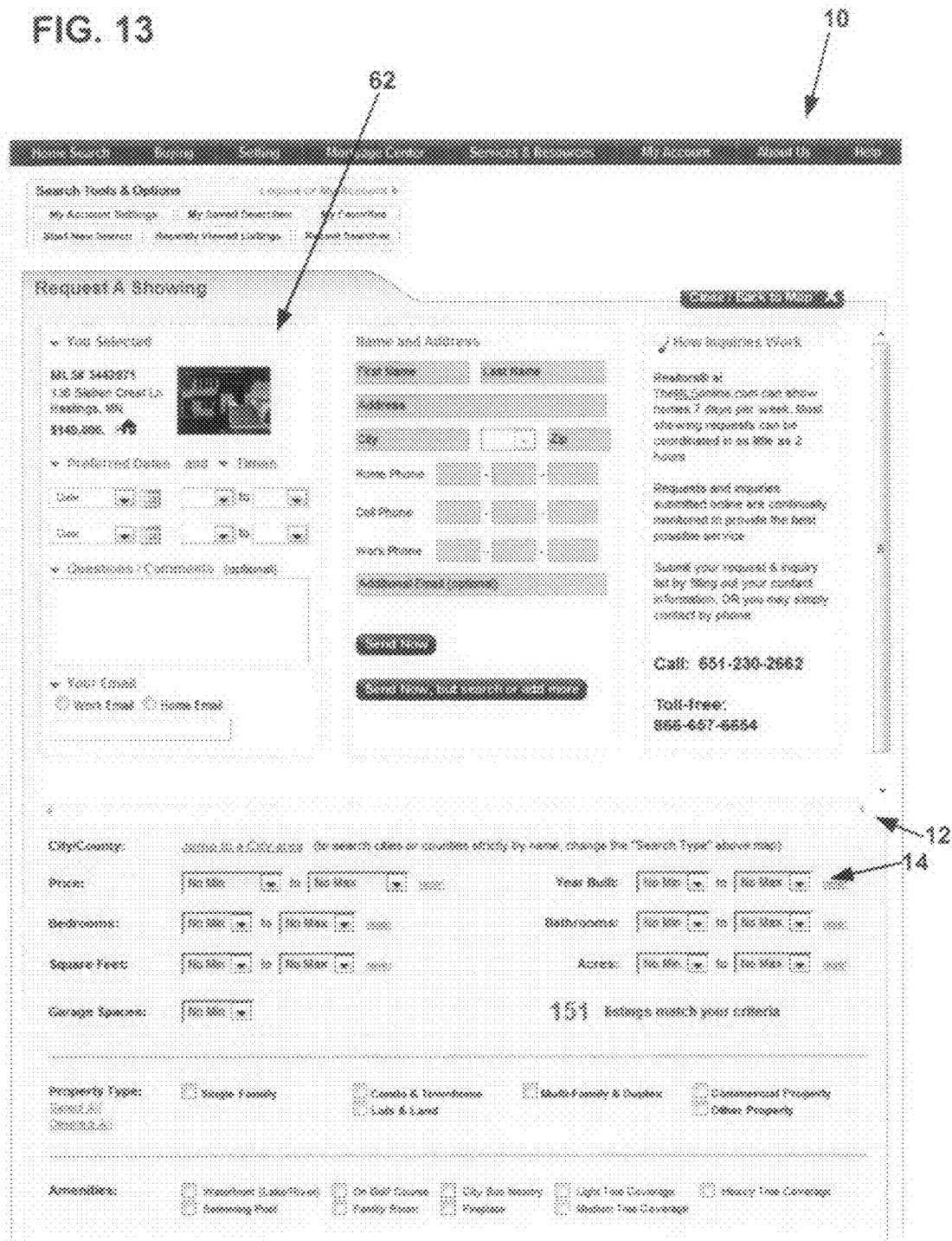
FIGS. 13 and 14 are illustrations of user interfaces that are configured to allow users to input contact information for agent follow-up on a particular property listing.
Figure 14:
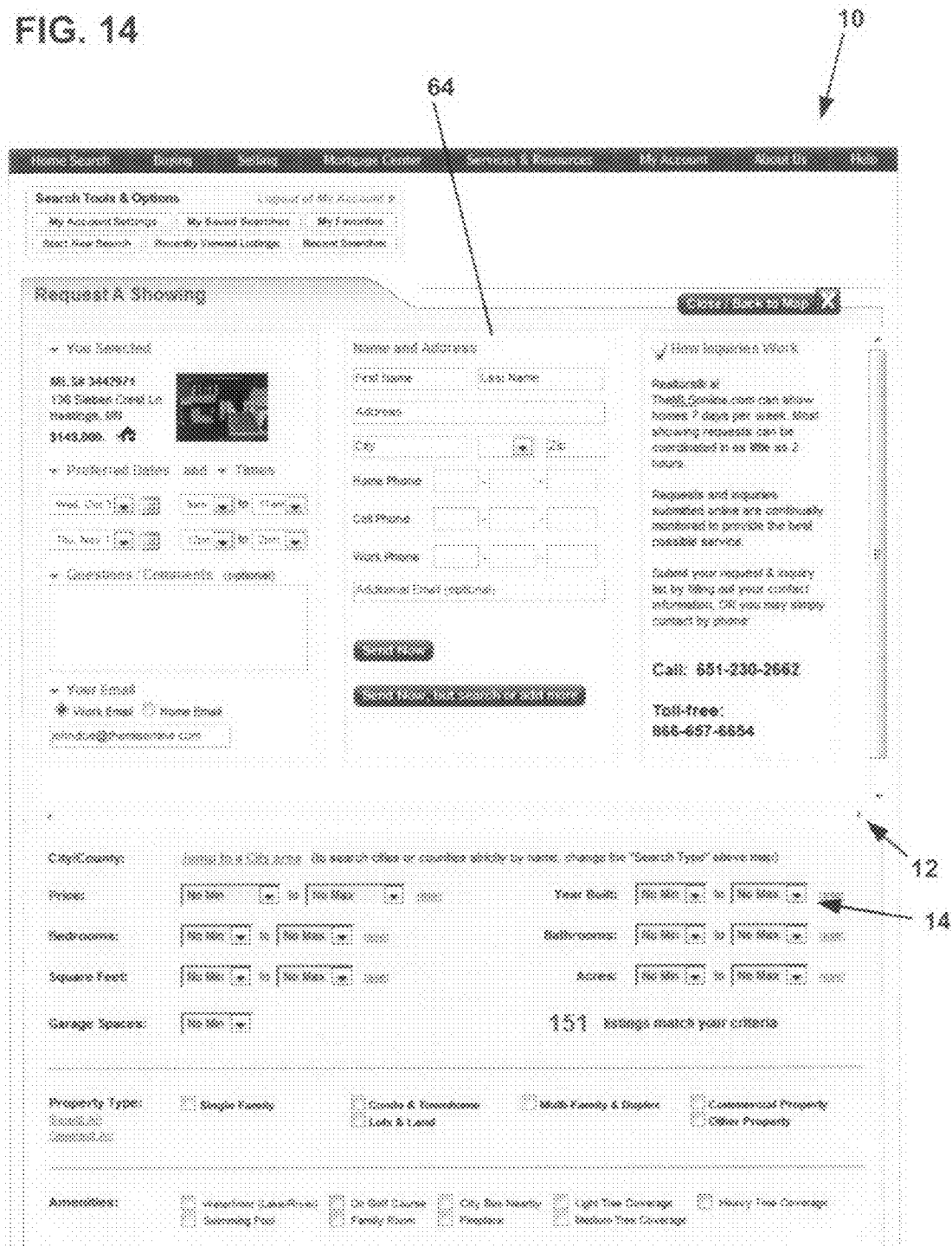

Referring now to FIGS. 13 and 14, there are shown online inquiry screens within interactive map area 12. When a user selects "Request A Showing" or "Inquire about this Listing" they are prompted to fill in information in a property and time box 62, including but not limited to selecting a date and time and/or writing an email to send a question. Once the user has selected a date and time and/or written their question in property and time box 62, the user is prompted to enter their email address in a contact information box 64. After inputting their email address, if the user clicks anywhere on the web page, including an enter button located therein, the user's email address, the property information, and the user's chosen date and time and/or question are saved for agent use and/or automatically emailed to the agent. Saving or emailing of this information occurs before the user fills out more information fields, including but not limited to full name, address, and phone contact information. Accordingly, agents have the ability to capture information about potential users prior to the user actually submitting all of their information. Agents can use this information to follow-up with potential users on a particular property and/or to provide potential users with information about similar property listings.

Figure 15:
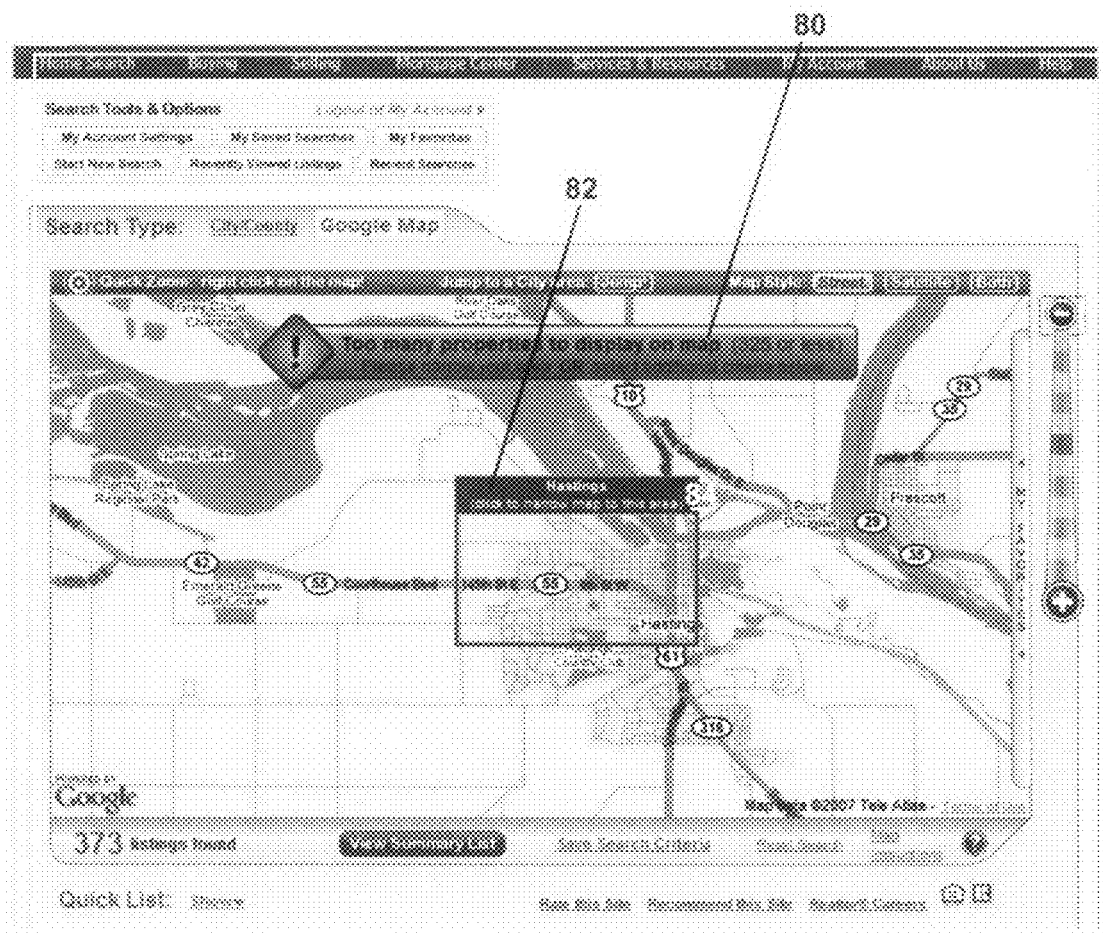
FIG. 15 is an illustration of the user interface when an excessive number of hits are obtained in response to search criteria entered by the user and a focusing tool is provided to the user.

In certain instances, it is necessary to provide an efficient method to focus a search when an excessive number of results are obtained. FIGS. 1 and 15 above, both illustrate circumstances where a large number of properties were found meeting desired search criteria. In each case, a warning box 80 is displayed indicating that an excessive number of properties have been discovered (in this case over 325 properties). This provides an indication to the user that a large number of search results meet their desired criteria and further narrowing of the search is likely beneficial. As shown in these particular examples, FIG. 1 indicates that 38,097 listings were found in response to the search criteria, while FIG. 15 indicates that 373 listings were found. Naturally, this is an unmanageable number of results for the average user to process, and has prompted the creation of warning box 80. In these examples, a threshold level of 325 has been chosen to trigger the display of warning box 80. Those skilled in the art will clearly understand that the threshold of 325 is simply a chosen threshold chosen by the designers based upon any number of concerns.

Warning box 80 is also shown in FIG. 15, this time indicating that over 325 listings were obtained based upon the used search criteria. In the example illustrated in FIG. 15 a different threshold number was chosen, resulting in the display shown.

Figure 16:
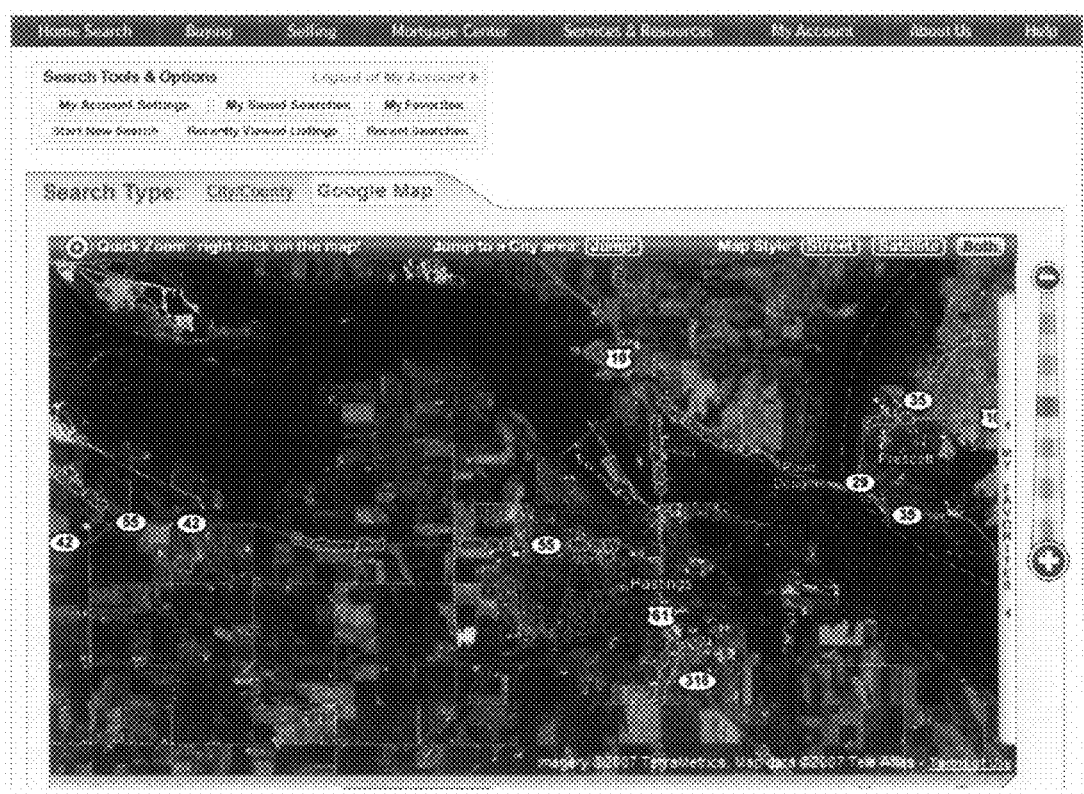
FIG. 16 is an illustration of the graphical user interface showing the results of a more focused search using the focus tool.

To help deal with excessive results in an effective and efficient manner, the present disclosure provides a search modification tool that is simple and easy to use. FIG. 15 illustrates a zoom box 82 that is created and presented to the user when an excessive number of listings is obtained. Zoom box 82 is shown in rectangular form and is movable about the map and overlays the map as shown in FIG. 15. Further, zoom box 82 includes an area title 84 shown at the top of zoom box 82 to provide some further guidance to the user. Zoom box 82 is movable by the user, using a common pointing device (i.e., mouse, scroll bar, touch pad, stylist, etc.). When moved over the display of a map, geo-codes in the map area are used to provide an indication of the area being outlined by zoom box 82. This allow area tile 84 to be displayed, indicating the particular region or area involved. Once a desired area is found, the user will click the pointing device, thus automatically causing the existing search to further zoom the geographic region being searched, while also maintaining their previously entered search criteria. For example, price ranges and any further previously entered criteria are maintained, while only the geographical region is modified. Upon clicking zoom box tool 82, a more specific display is presented to the user which graphically presents various properties. One example of this resulting display is illustrated in FIG. 16. FIG. 16 resembles the results shown above wherein each listing is illustrated by a listing icon. The user may then navigate the search map as discussed above.

The use of zoom box tool 82 provides the user with an easy and convenient methodology to focus their search of listings. Most significantly, the narrowing of listings is achieved without having to reenter previously established search criteria.

One challenge for providing online resources is the ability to provide relevant and focused information to a user in a timely and effective manner. Typically, this requires designers to develop tools that provide the ability to quickly and easily obtain the information a user typically desires. In the context of online property listings, this typically involves providing search resources that quickly and easily allows users to focus on the details most relevant to them. Often, this involves providing an ability to search property listings within a geographic area that meet selected user requirements. Generally speaking, the present disclosure provides such a tool, which quickly and easily allows this focusing.

Figure 17:
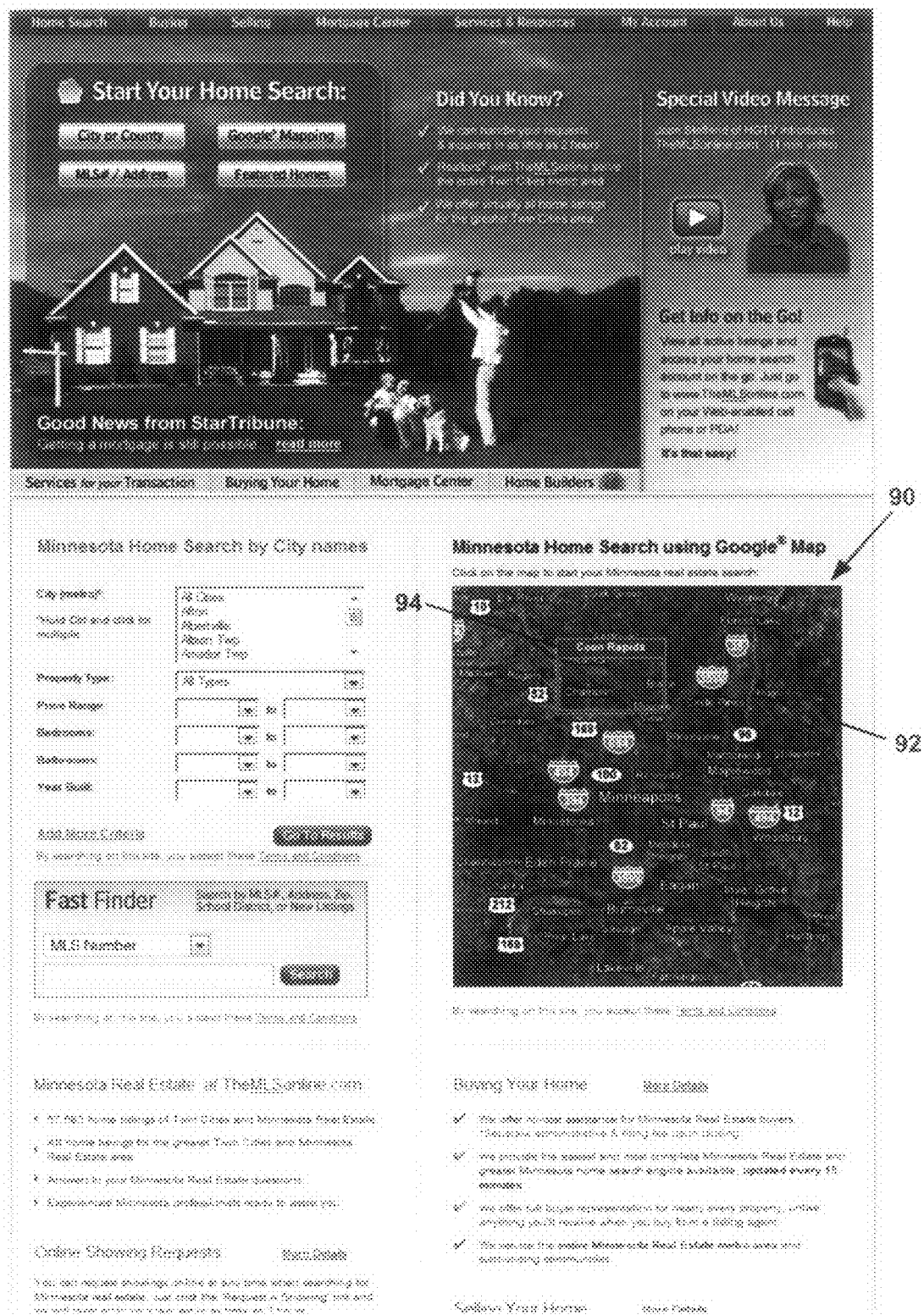
FIG. 17 is an illustration showing the initial user interface page presented to the user.

Referring now to FIG. 17, there is shown a top level illustration of one embodiment of the user interface. As can be seen, large amounts of information are presented to a user at this level of the interface, including many different search tools. Most significantly, illustrated in FIG. 17 is a graphical search tool 90 that provides a high level map 92 in conjunction with a focusing box 94. In this particular illustration, focusing box 94 is a red box outlining an area of map 92. Focusing box 94 defines a focusing box area. In many embodiments, the focusing box 94 area is a fixed size. The number of real estate listings present in focusing box 94 area is reported or displayed. Similar to zoom box 82 discussed above, focusing box 94 is movable by the user utilizing any standard pointing device and the focusing box 94 overlays the interactive map area (described above) or high level map 92. For sake of description, use in conjunction with a standard computer mouse will be discussed further below.

Figure 18:
FIG. 18 is a more focused view of the focused graphical search tool available to a user on the initial page shown in FIG. 17.
Figure 19:
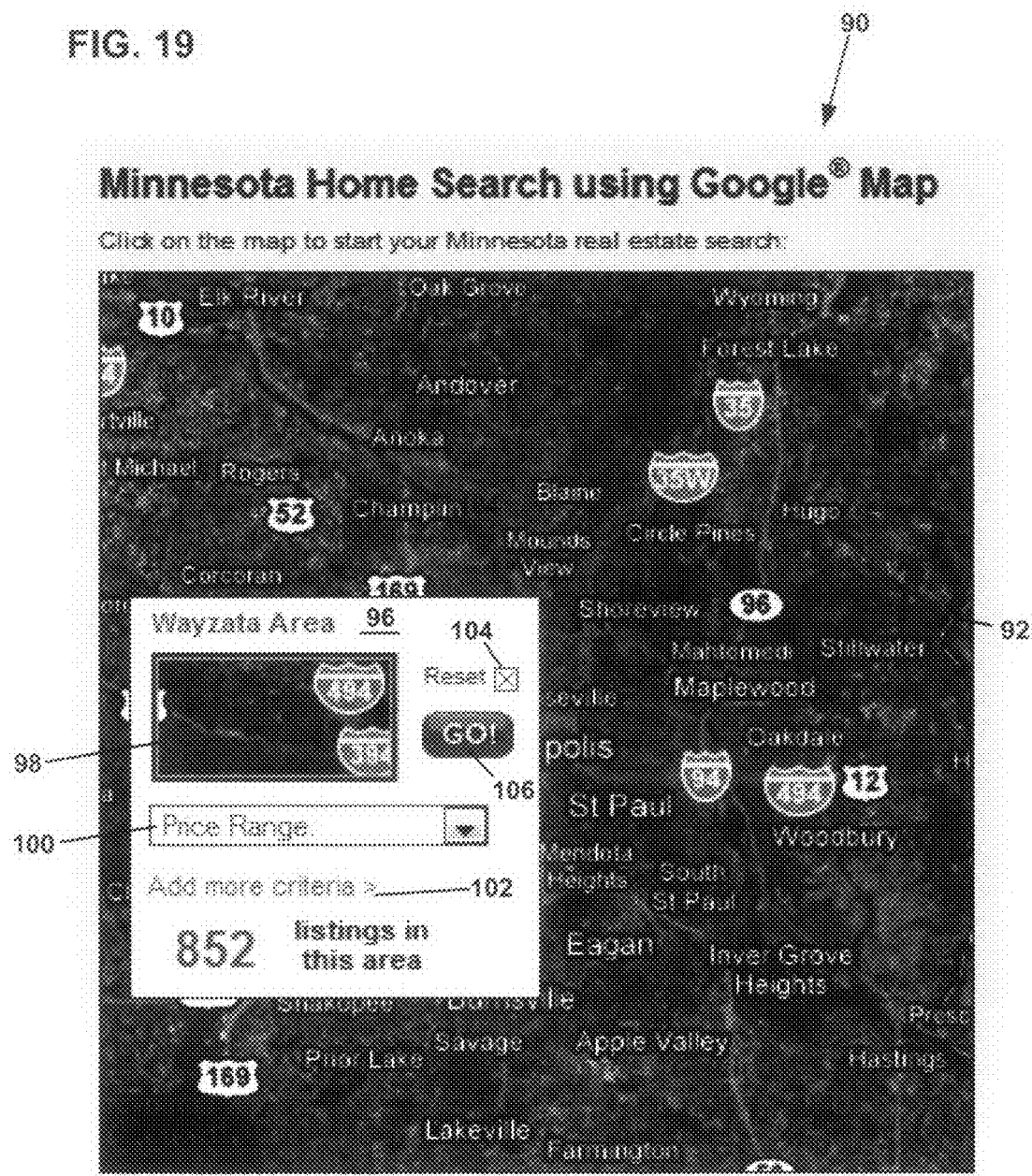
FIG. 19 is yet another detailed illustration of the focus search tool once regional information has been selected.
Figure 20:
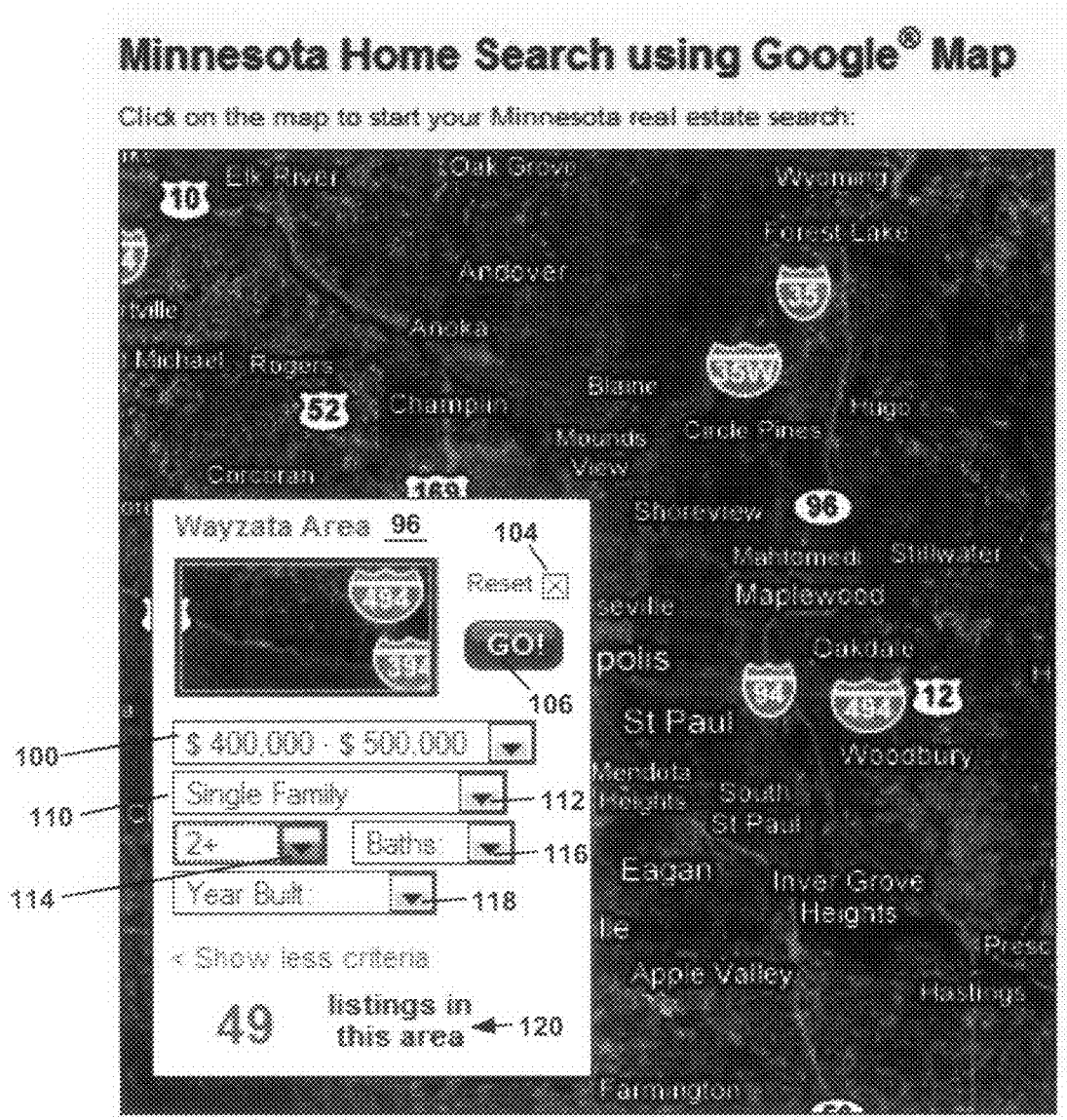
FIG. 20 is yet a further illustration of the focus search tool provided, where additional search criteria have been entered and high level results are shown.

FIGS. 18-20 illustrate expanded views of graphical search tool 90 at different stages of use. In this embodiment, these illustrations are simply a segment of the user interface illustrated in FIG. 17. That said, graphical search tool 90 could be included at other points in the user interface, and does not necessarily have to exist at a top level page. As shown in detail in FIG. 18, focusing box 94 is presented as an outline box having a location title line 96 and a top portion thereof. Location title line 96 will generally name the region being outlined by focusing box 94, as it is moved across the map. Location title 96 is based upon geo-codes in the map that generally indicate which geographic area is highlighted. Thus, graphical search tool 90 provides the user with the ability to move focusing box 94 to a desired region on high level map 92, thus geographically focusing property search activities. Once a desired location is highlighted, the user may click their pointing device which will cause focusing box 94 to freeze in the particular location being surrounded. At this point, focusing box 94 will be slightly reconfigured to provide the user with the ability to further focus their property search, without opening new windows or search tools.

As mentioned above, once a particular region on the high level map is selected, focusing box 94 changes its appearance. Illustrated in FIG. 19 is the next level of an exemplary focused search. In this situation, the user has selected a particular geographic region using focusing box 94, and clicked upon that region. This causes a first level criteria box 98 to be presented. Again, location title 96 is maintained within first level criteria box 98, however additional information and options have been provided to the user. As illustrated, a price range selection box 100 is now presented to the user within first level criteria box 98. This provides a drop down menu allowing to enter price range for their particular search. In addition, three other tools are provided including add criteria tool 102 reset tool 104 and Go button 106. These additional tools provide the user with additional abilities without having to open further windows or menus. Go button 106 will initiate the desired search and will cause searching activity to be launched, thus providing property listings meeting the criteria provided at that point. The results of this search will traditionally be provided in a new window or display, such as the window shown in FIG. 16. In summary, the tools presented in FIG. 19 allow the user to graphically select a desired location and price range, and launch their search using this criteria alone. The search results presented at this point are generally discussed above in the various figures.

Executing the Go button can open a new web page that includes the interactive map area 12 described in FIGS. 1-14, showing a listing icon of each real estate listing of the total number of real estate listings reported with focusing box 94.

Assuming however that the user desires to add more detail to their search, the add criteria tool 102 is selected causing yet a second level search box 110 to be presented to the user. Referring now to FIG. 20, the second level search box 110 is illustrated in further detail. As can be seen, many of the similar tools and indicators discussed above are retained including location title 96, price range selector 100, reset selector 104 and Go button 106. In this case, however second level criteria box also presents additional search criteria selectors, further allowing users to focus their search. In this particular case, a home type selector 112, a number of bedrooms selector 114, a number of bathrooms selector 116, and a year built selector 118. Naturally, any combination of these search criteria selectors, or additional criteria selections could be provided to the user, depending upon the desired operation. In each case however, each of these selectors provide drop down menus for a user to input their desired criteria.

In addition to the features outline above, the second level criteria box 110 also includes a results listing 120 at a bottom portion thereof. Results listing 120 will provide immediate feedback to the user depending upon the criteria input above. In this particular case, using the geographic region, price range, home type, and number of bedroom selections made resulted in 47 property listings meeting this criteria. Naturally, each time one of these ranges or criteria are changed, the results will be modified, depending upon the property listings available. In this way, the user is provided with immediate feedback regarding the changes made. Again, once the Go button 106 is pressed, the more detailed search pages are presented to the user as generally outlined above.

Referring to FIGS. 17-20, it is generally illustrated that a search tool is immediately available to the users, thus quickly allowing them to focus their search activities. This resource gives users immediate access to searching activities in a user friendly graphical manner. More specifically, the tools are provided in conjunction with displayed maps (i.e., layered over the particular map) thereby giving the user a specific indication of the region in question. These tools combine to provide user friendly tools, thus allowing users to easily begin searching of properties listed in the online databases available. Naturally, any combination of the tools or features presented could be used depending on the anticipated needs of the users. For example, in some regions it may be necessary to provide the ability to search only price and property type.

Thus, embodiments of the INTERACTIVE GRAPHICAL INTERFACE FOR REAL ESTATE LISTINGS are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A method of providing an interface for searching real estate listings utilizing the Internet comprising:

providing a real estate interactive graphical user interface to be interacted with by a user to search and view real estate listings;

displaying, on a display device, the real estate interactive graphical user interface on an Internet web page, the real estate interactive graphical user interface comprising an interactive map area displaying satellite imagery, aerial photo imagery, or a rendered graphic street map;

overlaying a focusing box on only a portion of the displayed interactive map area of the real estate interactive graphical user interface, the focusing box defining a focusing box area, wherein the focusing box displays a location title indicating a location of the focusing box area on the displayed interactive map area, wherein the focusing box and interactive map area are displayed at the same time;

displaying, on the focusing box, a total number of real estate listings present in the focusing box area, wherein the focusing box comprises additional search criteria comprising price range;

allowing a user to interact with the real estate interactive graphical user interface to move the focusing box about the interactive map area;

allowing a user to interact with the real estate interactive graphical user interface to select a price range in the additional search criteria of the focusing box;

updating the total number of real estate listings displayed on the focusing box in response to the price range in the additional search criteria of the focusing box being selected by the user;

allowing a user to interact with the real estate interactive graphical user interface to initiate a search of real estate listings present in the focusing box area; and displaying a larger version of the focusing box area, within the interactive map area, with a listing icon of each real estate listing of the total number of real estate listings in response to initiation of the search of real estate listings present in the focusing box area by the user, wherein each listing icon is displayed at a location of the real estate listing on the interactive map area.

2. A method according to claim 1, wherein focusing box area is a fixed size on the displayed interactive map area and the interactive map area is a fixed size.

3. A method according to claim 1, wherein the allowing a user to interact with the real estate interactive graphical user interface to move the focusing box about the interactive map area comprises allowing the user to move the focusing box about the displayed interactive map area using a pointing device comprising a mouse, scroll bar, touch pad, or stylus.

4. A method according to claim 3, wherein the total number of real estate listings present in the focusing box area is displayed when prompted by a user input with the pointing device.

5. A method according to claim 1, wherein the additional search criteria are added to the focusing box without reloading the entire Internet web page.

6. A method according to claim 1, wherein the additional search criteria are added to the focusing box by only modifying or reloading the focusing box displayed on the Internet web page.

7. A method according to claim 1, wherein the focusing box comprises a reset tool that allows a user when interacting with the real estate interactive graphical user interface to remove the additional search criteria.

8. The method according to claim 1 further comprising updating the total number of real estate listings displayed on the focusing box in response to the focusing box being moved about the interactive map area by the user.

9. A method of providing an interface for searching real estate listings utilizing the Internet comprising:
   providing a real estate interactive graphical user interface to be interacted with by a user to search and view real estate listings;
   displaying, on a display device, the real estate interactive graphical user interface on an Internet web page, the real estate interactive graphical user interface comprising an interactive map area displaying satellite imagery, aerial photo imagery, or a rendered graphic street map, and one or more listing icons indicating a location of each one or more real estate listings on the interactive map area;
   allowing a user to interact with the real estate interactive graphical user interface to position an active curser on the interactive map area at a particular latitude and longitude coordinate location on the interactive map area;
   allowing a user to interact with the real estate interactive graphical user interface to initiate display of a rapid search icon and rapid search tool;
   displaying, in response to initiation of the display of the rapid search icon and rapid search tool, the rapid search icon and rapid search tool at the particular latitude and longitude coordinate location on the interactive map area, the rapid search icon and rapid search tool overlaying only a portion of the interactive map area and being within the interactive map area, wherein the rapid search tool and interactive map area are displayed at the same time, the rapid search tool comprising a functional list of search or viewing commands;
   displaying a total number of real estate listings present in the interactive map area;
   allowing a user to interact with the real estate interactive graphical user interface to execute a command from the functional list of search or viewing commands of the rapid search tool; and
   reloading the interactive map area of the real estate interactive graphical user interface on the Internet web page without reloading the entire Internet web page in response to execution of the command from the functional list of search or viewing commands of the rapid search tool by the user.

10. A method according to claim 9, wherein the allowing a user to interact with the real estate interactive graphical user interface to initiate display of a rapid search icon and rapid search tool comprises allowing the user to initiate the display of the rapid search icon using a keyboard key stroke or a mouse click.

11. A method according to claim 9, wherein the functional list comprises a go to street level command, a go to city level command, or a recenter map here command.

12. A method according to claim 9, further comprising allowing the user to interact with the real estate interactive graphical user interface to use the active cursor to move the interactive map area without reloading the entire Internet web page.

13. A method according to claim 9, further comprising:
   allowing a user to interact with the real estate interactive graphical user interface to position the active curser on a listing icon; and
   upon the positioning of the active curser on the listing icon, displaying a listing box overlaying a portion of the interactive map area, the listing box displaying information about a real estate listing associated with the listing icon.

14. A method according to claim 13, further comprising:
   allowing a user to interact with the real estate interactive graphical user interface to select the listing icon with the active cursor; and
   upon selection of the listing icon with the active curser, replacing the interactive map area with listing details of the selected listing icon without reloading the entire Internet web page.

15. A method according to claim 14, wherein the listing details comprises a close detail button, wherein the method further comprises:
   allowing a user to interact with the real estate interactive graphical user interface to select the close detail button; and
   upon selection of the close detail button, replacing the listing details of the selected listing icon with the interactive map area without reloading the entire Internet web page.

* * * * *